(12) United States Patent
Gong et al.

(10) Patent No.: US 12,349,171 B2
(45) Date of Patent: Jul. 1, 2025

(54) SERVICE TRANSMISSION METHOD, AND APPARATUS

(71) Applicant: Huawei Technologies Co., Ltd., Shenzhen (CN)

(72) Inventors: Zhengwei Gong, Shanghai (CN); Qi Yang, Shanghai (CN); Zhenghu Ding, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 340 days.

(21) Appl. No.: 17/820,079

(22) Filed: Aug. 16, 2022

(65) Prior Publication Data
US 2022/0394729 A1    Dec. 8, 2022

Related U.S. Application Data

(63) Continuation of application No. PCT/CN2021/075984, filed on Feb. 8, 2021.

(30) Foreign Application Priority Data

Feb. 17, 2020 (CN) .................. 202010096886.X

(51) Int. Cl.
*H04W 72/12* (2023.01)
*H04L 5/00* (2006.01)
*H04W 72/1263* (2023.01)
*H04W 72/52* (2023.01)

(52) U.S. Cl.
CPC ........... *H04W 72/52* (2023.01); *H04L 5/0051* (2013.01); *H04W 72/1263* (2013.01)

(58) Field of Classification Search
CPC ..... H04W 72/52; H04W 72/50; H04W 72/12; H04W 72/1263; H04W 72/1268; H04W 72/1273; H04L 5/0051; H04L 5/0048; H04L 5/0037; H04L 5/0053; H04L 5/003; H04L 5/0042
See application file for complete search history.

(56) References Cited

U.S. PATENT DOCUMENTS

2021/0273758 A1*   9/2021   Liu ..................... H04L 5/005
2022/0394729 A1*   12/2022   Gong ................ H04L 5/0051

FOREIGN PATENT DOCUMENTS

| CN | 102083179 A | 6/2011 |
|---|---|---|
| CN | 102340853 A | 2/2012 |
| CN | 102577587 A | 7/2012 |
| CN | 102714888 A | 10/2012 |
| CN | 103460766 A | 12/2013 |
| CN | 104272799 A | 1/2015 |

(Continued)

*Primary Examiner* — Phong La
(74) *Attorney, Agent, or Firm* — Slater Matsil, LLP

(57) ABSTRACT

Embodiments of this application provide a service transmission method and an apparatus. The method includes: determining a traffic volume in a first time unit; determining, based on the traffic volume and a first mapping relationship, to enable a first quantity of radio frequency channels in the first time unit, where the first mapping relationship includes a mapping relationship between the traffic volume and a quantity of radio frequency channels; and transmitting a service through the first quantity of radio frequency channels in the first time unit, where the service includes at least one of a data channel and a reference signal.

20 Claims, 8 Drawing Sheets

(56) References Cited

FOREIGN PATENT DOCUMENTS

| | | | | |
|---|---|---|---|---|
| CN | 105682208 | A | 6/2016 | |
| CN | 102325361 | B | 6/2017 | |
| CN | 102394685 | B * | 7/2017 | |
| CN | 107567077 | A | 1/2018 | |
| CN | 108260190 | A | 7/2018 | |
| CN | 108616906 | A | 10/2018 | |
| CN | 109391387 | A | 2/2019 | |
| CN | 109644396 | A | 4/2019 | |
| CN | 109660324 | A | 4/2019 | |
| CN | 110677873 | A | 1/2020 | |
| CN | 112118617 | A | 12/2020 | |
| EP | 3223482 | B1 * | 7/2019 | ........... H04L 1/0003 |
| EP | 2854303 | B1 * | 8/2019 | ............... H04B 7/06 |
| EP | 4084387 | A1 * | 11/2022 | ........... H04L 5/0023 |
| JP | 2005033338 | A | 2/2005 | |
| JP | 2007150416 | A | 6/2007 | |
| JP | 2008079262 | A | 4/2008 | |
| JP | 2015053569 | A | 3/2015 | |
| JP | 5884152 | B2 | 3/2016 | |
| JP | 2019125820 | A | 7/2019 | |
| WO | 2012071827 | A1 | 6/2012 | |
| WO | 2014038865 | | 3/2014 | |
| WO | 2017000791 | A1 | 1/2017 | |
| WO | WO-2017050209 | A1 * | 3/2017 | .............. H04J 11/00 |
| WO | 2017162106 | A1 | 9/2017 | |
| WO | WO-2019007159 | A1 * | 1/2019 | ........... H04L 5/0008 |
| WO | WO-2019011307 | A1 * | 1/2019 | ........... H04L 1/0003 |

* cited by examiner

SERVICE TRANSMISSION METHOD, AND APPARATUS

CROSS-REFERENCE TO RELATED APPLICATIONS

This application is a continuation of International Application No. PCT/CN2021/075984, filed on Feb. 8, 2021, which claims priority to Chinese Patent Application No. 202010096886.X, filed on Feb. 17, 2020. The disclosures of the aforementioned applications are incorporated herein by reference in these entireties.

TECHNICAL FIELD

This application relates to the field of wireless communication technologies, and in particular, to a service transmission method, and an apparatus.

BACKGROUND

Currently, a multiple-input multiple-output (MIMO) technology becomes a key technology for improving system capacities of mobile communication systems such as a new radio (NR) system and a long term evolution (LTE) system. As a MIMO specification continuously improves, more antennas are configured on a base station, and a quantity of radio frequency channels on the base station also linearly increases with the quantity of antennas of the base station.

A radio frequency channel in the base station includes modules such as a power amplifier, a low noise amplifier, a digital-to-analog converter, a radio frequency chip, and a peripheral circuit. As the quantity of radio frequency channels increases, power consumption of the base station accordingly increases. For example, when the quantity of antennas of the base station increases from 2 to 64, power consumption corresponding to components included in the radio frequency channel of the base station increases from 150 W to 600 W.

Therefore, how to reduce power consumption of the base station is an urgent problem to be resolved.

SUMMARY

An objective of implementations of this application is to provide a service transmission method and an apparatus, to resolve a problem of how to reduce power consumption of a base station.

According to a first aspect, an embodiment of this application provides a service transmission method. The method includes: determining a traffic volume in a first time unit; determining, based on the traffic volume and a first mapping relationship, to enable a first quantity of radio frequency channels in the first time unit, where the first mapping relationship includes a mapping relationship between the traffic volume and a quantity of radio frequency channels; and transmitting a service through the first quantity of radio frequency channels in the first time unit, where the service includes at least one of a data channel and a reference signal.

According to the foregoing method, a quantity of to-be-enabled radio frequency channels is determined based on the traffic volume, so that the quantity of to-be-enabled radio frequency channels can be reduced, thereby reducing power consumption.

In a possible design, before the transmitting a service through the first quantity of radio frequency channels, the method further includes: determining a second mapping relationship between the first quantity of radio frequency channels and a second quantity of antenna ports, where the second quantity does not vary with the first quantity.

In a possible design, the second quantity of antenna ports are all antenna ports included in a network device.

In this method, any antenna port for sending a signal may not be disabled, and remapping between a radio frequency channel and an antenna port is performed, to ensure that an antenna port actually used by the network device to send a signal matches an antenna port determined by a terminal device, so as to improve system performance when some channels are disabled. In addition, after the remapping between the radio frequency channel and the antenna port is performed, the network device does not need to be restarted, and transmission of the service is not interrupted.

In a possible design, the second mapping relationship includes a mapping relationship between any one of the second quantity of antenna ports and at least one of the first quantity of radio frequency channels. When the first quantity is greater than or equal to the second quantity, different antenna ports of the second quantity of antenna ports are mapped to different radio frequency channels; or, when the first quantity is less than the second quantity, at least two of different antenna ports of the second quantity of antenna ports are mapped to a same radio frequency channel.

In a possible design, when the first quantity is less than the second quantity, when the first quantity is greater than 1, and the second quantity of antenna ports include at least two antenna ports for transmitting a diversity-based transmit data channel, each of the at least two antenna ports is mapped to a different radio frequency channel.

In a possible design, the transmitting a service through the first quantity of radio frequency channels includes: transmitting, based on the second mapping relationship through at least one radio frequency channel to which each of the second quantity of antenna ports is mapped, a service corresponding to each antenna port.

In a possible design, the first quantity of radio frequency channels is a quantity of radio frequency channels included in a second radio frequency channel group or a quantity of radio frequency channels included in a first radio frequency channel group. The determining, based on the traffic volume and a first mapping relationship, to enable a first quantity of radio frequency channels in the first time unit includes: if the traffic volume is less than a first threshold, enabling the first radio frequency channel group or the second radio frequency channel group in the first time unit; and if the traffic volume is greater than or equal to the first threshold, enabling the first radio frequency channel group in the first time unit, where the radio frequency channels included in the second radio frequency channel group are radio frequency channels shared by the first radio frequency channel group and the second radio frequency channel group, and the quantity of radio frequency channels included in the first radio frequency channel group is greater than the quantity of radio frequency channels included in the second radio frequency channel group.

In a possible design, the transmitting a service through the first quantity of radio frequency channels includes: if the traffic volume is less than the first threshold, sending the reference signal in the first time unit through a first antenna port group corresponding to the first radio frequency channel group; and sending a data channel in the first time unit through a second antenna port group corresponding to the second radio frequency channel group.

In a possible design, if the traffic volume is greater than or equal to the first threshold, the reference signal and the data channel are sent in the first time unit through the first antenna port group corresponding to the first radio frequency channel group.

In a possible design, any antenna port in the second antenna port group belongs to the first antenna port group, and the first antenna port group includes at least one antenna port that does not belong to the second antenna port group, where one antenna port group includes at least one antenna port.

In a possible design, the traffic volume includes a first traffic volume of a first cell and a second traffic volume of a second cell. The first cell and the second cell belong to a same network device.

In a possible design, the first quantity of radio frequency channels is a quantity of radio frequency channels included in a fourth radio frequency channel group or a quantity of radio frequency channels included in a third radio frequency channel group. The determining, based on the traffic volume and a first mapping relationship, to enable a first quantity of radio frequency channels in the first time unit includes: if at least one of the first traffic volume and the second traffic volume is greater than or equal to a second threshold, enabling the third radio frequency channel group in the first time unit; and if both the first traffic volume and the second traffic volume are less than the second threshold, enabling the fourth radio frequency channel group in the first time unit, where the radio frequency channels included in the fourth radio frequency channel group are radio frequency channels shared by the third radio frequency channel group and the fourth radio frequency channel group, and the quantity of radio frequency channels included in the third radio frequency channel group is greater than the quantity of radio frequency channels included in the fourth radio frequency channel group.

According to the foregoing method, a quantity of to-be-enabled radio frequency channels is determined based on traffic volumes of different cells, so that the quantity of to-be-enabled radio frequency channels can be reduced when the traffic volumes of the cells decrease, thereby achieving energy saving and power consumption reduction.

In a possible design, the transmitting a service through the first quantity of radio frequency channels includes: when the third radio frequency channel group is enabled in the first time unit, sending a service of the first cell and/or a service of the second cell through the third radio frequency channel group; or when the fourth radio frequency channel group is enabled in the first time unit, sending a service of the first cell and/or a service of the second cell through the fourth radio frequency channel group.

In a possible design, the first quantity of radio frequency channels is a quantity of radio frequency channels included in a fifth radio frequency channel group, or a quantity of radio frequency channels included in a sixth radio frequency channel group, or a quantity of radio frequency channels included in a seventh radio frequency channel group. The determining, based on the traffic volume and a first mapping relationship, to enable a first quantity of radio frequency channels in the first time unit includes: if the traffic volume is greater than or equal to the second threshold, enabling the fifth radio frequency channel group; if the traffic volume is greater than the first threshold and less than the second threshold, enabling the sixth radio frequency channel group; and if the traffic volume is less than or equal to the first threshold, enabling the seventh radio frequency channel group. All radio frequency channels included in the sixth radio frequency channel group belong to the fifth radio frequency channel group, and the quantity of radio frequency channels included in the fifth radio frequency channel group is greater than the quantity of radio frequency channels included in the sixth radio frequency channel group. All radio frequency channels included in the seventh radio frequency channel group belong to the fifth radio frequency channel group, and the quantity of radio frequency channels included in the sixth radio frequency channel group is greater than the quantity of radio frequency channels included in the seventh radio frequency channel group.

In a possible design, the transmitting a service through the first quantity of radio frequency channels includes: when the fifth radio frequency channel group is enabled in the first time unit, transmitting the service through the fifth radio frequency channel group; when the sixth radio frequency channel group is enabled in the first time unit, transmitting the service through the sixth radio frequency channel group; or when the seventh radio frequency channel group is enabled in the first time unit, transmitting the service through the seventh radio frequency channel group.

In a possible design, when the service is a downlink service, the radio frequency channel includes at least one of a power amplifier, a low noise amplifier, a digital-to-analog converter, and a radio frequency signal processing unit; or when the service is an uplink service, the radio frequency channel includes at least one of a small-signal amplifier, a low noise amplifier, an analog-to-digital converter, and a radio frequency signal processing unit.

According to a second aspect, an embodiment of this application provides a communication apparatus, and the communication apparatus may perform any one of the foregoing methods.

In a possible design, the apparatus includes one or more processors and a communication interface. The one or more processors are configured to support the apparatus in performing corresponding functions of the network device in the foregoing method, for example, generating resource configuration information. The communication interface is configured to support the apparatus in communicating with another device, to implement a receiving function and/or a sending function, for example, to send resource configuration information.

Optionally, the apparatus may further include one or more memories. The memory is coupled to the processor, and stores program instructions and/or data that are/is necessary for the network device. The one or more memories may be integrated with the processor, or may be disposed separately from the processor. This is not limited in this application.

The apparatus may be a base station, a gNB, a TRP, or the like. The communication interface may be a transceiver or a transceiver circuit. Optionally, the transceiver may alternatively be an input/output circuit or interface.

The apparatus may alternatively be a communication chip. The communication interface may be an input/output circuit or interface of the communication chip.

In another possible design, the apparatus includes a transceiver, a processor, and a memory. The processor is configured to control the transceiver to receive and send a signal. The memory is configured to store a computer program. The processor is configured to run the computer program in the memory, so that the apparatus performs the method implemented by the network device in any one of the first aspect or the possible implementations of the first aspect.

In a possible implementation, the communication apparatus includes corresponding function units, respectively configured to implement the steps in the foregoing method. A function may be implemented by hardware, or may be implemented by hardware executing corresponding software. The hardware or the software includes one or more units corresponding to the foregoing function.

In a possible implementation, a structure of the communication apparatus includes a processing unit and a communication unit. These units may perform corresponding functions in the foregoing method examples. For details, refer to the descriptions in the method according to the first aspect. Details are not described herein again.

According to a third aspect, a computer-readable storage medium is provided, and is configured to store a computer program. The computer program includes instructions used to perform the method in any one of the first aspect or the possible implementations of the first aspect.

According to a fourth aspect, a computer program product is provided. The computer program product includes computer program code. When the computer program code is run on a computer, the computer is enabled to perform the method in any one of the first aspect or the possible implementations of the first aspect.

According to a fifth aspect, this application provides a communication apparatus. The communication apparatus includes a processor and a memory. The memory is configured to store a computer program or instructions, and the processor is configured to execute the computer program or the instructions stored in the memory, to enable the communication apparatus to perform the method in any one of the first aspect or the possible implementations of the first aspect.

According to a sixth aspect, this application provides a chip, including a processor. The processor is coupled to a memory, and is configured to execute a computer program or instructions stored in the memory. When the processor executes the computer program or the instructions, the method in any one of the first aspect or the possible implementations of the first aspect is implemented.

DETAILED DESCRIPTION OF ILLUSTRATIVE EMBODIMENTS

The following describes embodiments of this application in detail with reference to the accompanying drawings of this specification.

Technical solutions of embodiments of this application may be applied to various MIMO-supported communication systems, such as a new radio (NR) system, a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD), a universal mobile telecommunications system (UMTS), a worldwide interoperability for microwave access (WiMAX) communication system, or the like. This is not limited herein.

A terminal device in embodiments of this application may be a device having a wireless transceiver function or a chip that can be disposed in any device, or may also be referred to as user equipment (UE), an access terminal, a subscriber unit, a subscriber station, a mobile station, a remote station, a remote terminal, a mobile device, a user terminal, a wireless communication device, a user agent, or a user apparatus. The terminal device in embodiments of this application may be a mobile phone (mobile phone), a tablet computer (Pad), a computer having a wireless transceiver function, a virtual reality (VR) terminal, an augmented reality (AR) terminal, a wireless terminal in industrial control (industrial control), a wireless terminal in self driving (self driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), or the like.

A network device may be a next generation base station (gNB) in an NR system, may be an evolved base station (eNB) in an LTE system, may be a base transceiver station (BTS) in a global system for mobile communications (GSM) system or a code division multiple access (CDMA) system, may be a base station, NodeB (NB) in a wideband code division multiple access (WCDMA) system, or the like.

For ease of description, the technical solutions in embodiments of this application are described in detail by using a base station and a terminal as examples in this application.

Figure 1:
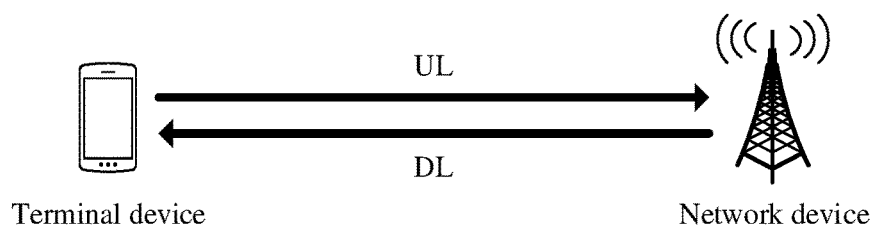
FIG. 1 is a schematic diagram of a structure of a wireless communication system applicable to an embodiment of this application.

FIG. 1 is a schematic diagram of a structure of a wireless communication system according to an embodiment of this application. As shown in FIG. 1, the wireless communication system includes a terminal device and a network device. FIG. 1 is merely an example. In actual application, connections may be established between a plurality of terminal devices and the network device. Depending on different transmission directions, a transmission link from the terminal device to the network device is denoted as an uplink (UL), and a transmission link from the network device to the terminal device is denoted as a downlink (DL). Similarly, data transmission over the uplink may be briefly referred to as uplink data transmission or uplink transmission, and data transmission over the downlink may be briefly referred to as downlink data transmission or downlink transmission.

In the wireless communication system, the terminal device and the network device support one or more same radio access technologies (RAT), for example, NR and LTE.

Figure 2:
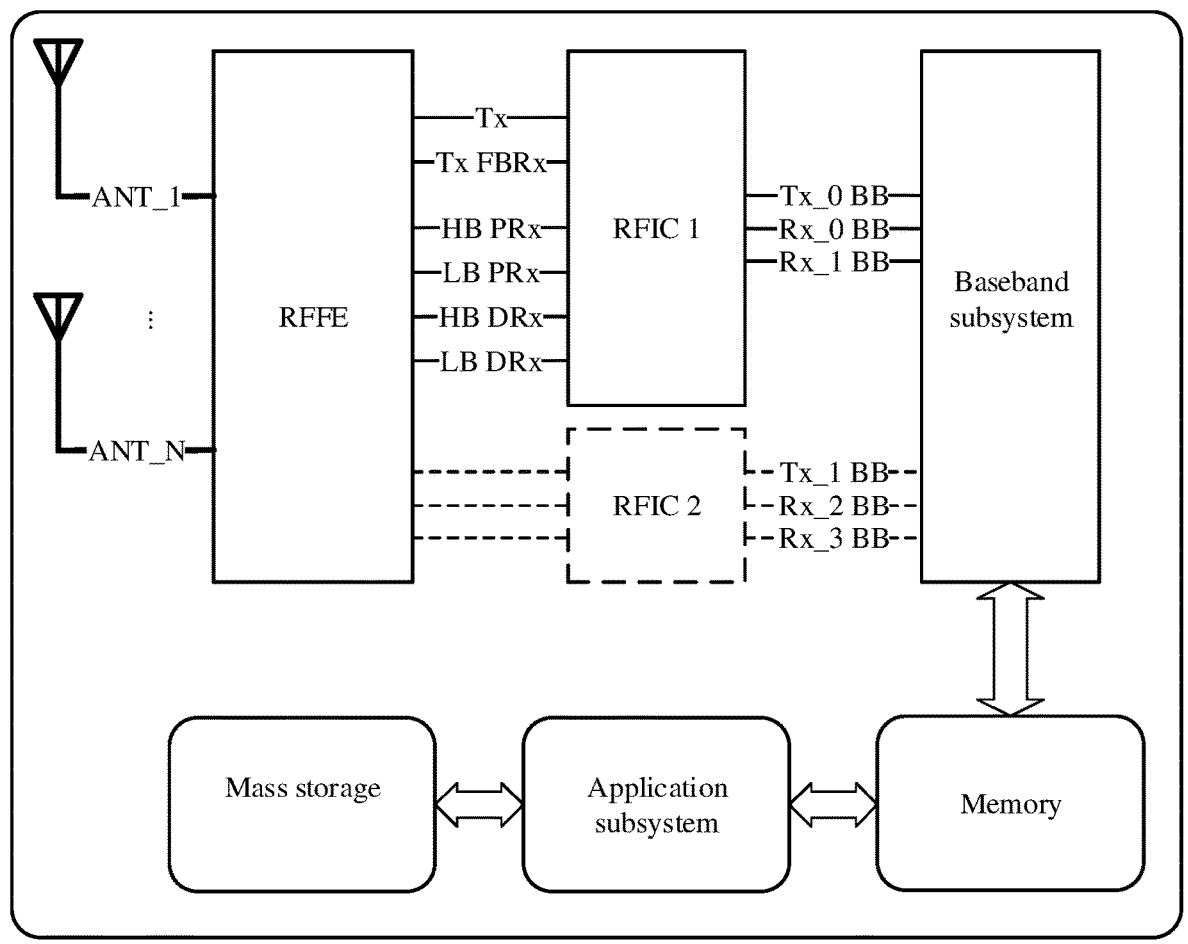
FIG. 2 is a schematic diagram of a structure of a communication apparatus according to an embodiment of this application.

FIG. 2 is a schematic diagram of a structure of a communication apparatus according to an embodiment of this application. The communication apparatus may be the network device in embodiments of this application. As shown in FIG. 2, the communication apparatus may include an application subsystem, a memory, a mass storage, a baseband subsystem, a radio frequency integrated circuit (RFIC), a radio frequency front end (RFFE) component, and an antenna (ANT). The components may be coupled to each other through various interconnection buses or in other electrical connection manners.

In FIG. 2, ANT_1 represents a first antenna, and by analogy, ANT_N represents an $N^{th}$ antenna, where N is a positive integer greater than 1. Tx represents a transmit path, and Rx represents a receive path. Different numbers represent different paths. FBRx represents a feedback receive path, PRx represents a primary receive path, and DRx represents a diversity receive path. HB represents a high band, LB represents a low band, and HB or LB indicates that a band is comparatively high or low. BB represents a baseband. It should be understood that marks and components in FIG. 2 are merely used for illustration, and are merely used as a possible implementation. Embodiments of this application further include another implementation.

The application subsystem may be used as a main control system or a main computing system of the communication apparatus, and is configured to run a main operating system and an application program, manage software and hardware resources of the entire communication apparatus, and provide a user operation interface for a user. The application subsystem may include one or more processing cores. In addition, the application subsystem may further include driver software related to another subsystem (for example, the baseband subsystem). The baseband subsystem may also include one or more processing cores, hardware accelerators (HAC), a cache, and the like.

In FIG. 2, the RFFE component and an RFIC 1 (and optionally an RFIC 2) may jointly form a radio frequency subsystem. The radio frequency subsystem includes radio frequency channels, and the radio frequency channels may further include a radio frequency receive channel and a radio frequency transmit channel.

The radio frequency receive channel may receive a radio frequency signal through an antenna, perform processing (such as amplification, filtering, and down-conversion) on the radio frequency signal to obtain a baseband signal, and transfer the baseband signal to the baseband subsystem. The radio frequency transmit channel may receive the baseband signal from the baseband subsystem, perform radio frequency processing (such as up-conversion, amplification, and filtering) on the baseband signal to obtain a radio frequency signal, and finally radiate the radio frequency signal into space through the antenna.

Specifically, the radio frequency transmit channel may include electronic devices such as a low noise amplifier (LNA), a power amplifier (PA), a mixer (mixer), a local oscillator (LO), a filter, and a digital-to-analog converter (DAC). These electronic devices may be integrated into one or more chips as required. The antenna may also sometimes be considered as a part of the radio frequency subsystem.

The radio frequency receive channel may include electronic devices such as a small-signal amplifier, a low noise amplifier (LNA), a power amplifier (PA), a mixer, a local oscillator (LO), a filter, and an analog-to-digital converter (ADC). These electronic devices may be integrated into one or more chips as required. The antenna may also sometimes be considered as a part of the radio frequency subsystem.

In embodiments of this application, the radio frequency transmit channel and the radio frequency receive channel may further include a radio frequency signal processing unit. The radio frequency signal processing unit may be a general-purpose processor, or may be a dedicated processor. For example, the processor may be a central processing unit (CPU), or may be a digital signal processor (DSP). Alternatively, the processor may be a microcontrol unit (MCU), a graphics processing unit (GPU), an image signal processor (ISP), an audio signal processor (ASP), or a processor dedicated to artificial intelligence (AI) application. The AI processor includes but is not limited to a neural network processing unit (NPU), a tensor processing unit (TPU), and a processor referred to as an AI engine.

It should be noted that the communication apparatus in embodiments of this application may include a plurality of radio frequency receive channels and a plurality of radio frequency transmit channels.

In embodiments of this application, there may be a volatile memory (volatile memory) and a non-volatile memory (NVM). The volatile memory is a memory in which data stored in the memory is lost after a power supply is interrupted. Currently, volatile memory is mainly random access memory (RAM), including a static random access memory (SRAM) and a dynamic random access memory (DRAM). The non-volatile memory is a memory in which data stored in the memory is not lost even if the power supply is interrupted. Common non-volatile memory include a read-only memory (ROM), an optical disc, a magnetic disk, various memories based on a flash memory technology, and the like. Usually, the volatile memory may be used as the memory, and the non-volatile memory, for example, the magnetic disk or a flash memory, may be used as the mass storage.

In embodiments of this application, the baseband subsystem and the radio frequency subsystem jointly form a communication subsystem, to provide a wireless communication function for the communication apparatus. Usually, the baseband subsystem is responsible for managing software and hardware resources of the communication subsystem, and may configure a working parameter of the radio frequency subsystem. The one or more processing cores of the baseband subsystem may be integrated into one or more chips, and the chip may be referred to as a baseband processing chip or a baseband chip. Similarly, the RFIC may be referred to as a radio frequency processing chip or a radio frequency chip. In addition, with evolution of technologies, function division of the radio frequency subsystem and the baseband subsystem in the communication subsystem may alternatively be adjusted. For example, some functions of the radio frequency subsystem are integrated into the baseband subsystem, or some functions of the baseband subsystem are integrated into the radio frequency subsystem. In actual application, depending on requirements of application scenarios, the communication apparatus may use a combination of different quantities of processing cores and different types of processing cores.

In embodiments of this application, the radio frequency subsystem may include an independent antenna, an independent radio frequency front-end (RFFE) component, and an independent radio frequency chip. The radio frequency chip is sometimes referred to as a receiver, a transmitter, or a transceiver. The antenna, the radio frequency front-end component, and the radio frequency processing chip each may be manufactured and sold separately. Certainly, the radio frequency subsystem may use different components or different integration manners depending on requirements for power consumption and performance. For example, the radio frequency front-end component is integrated into the radio frequency chip, or even both the antenna and the radio frequency front-end component are integrated into the radio frequency chip, and the radio frequency chip may alternatively be referred to as a radio frequency antenna module or an antenna module.

In embodiments of this application, the baseband subsystem may be used as an independent chip, and the chip may be referred to as a modem chip. A hardware component in the baseband subsystem may be manufactured and sold as a modem chip. The modem chip is sometimes referred to as a baseband chip or a baseband processor. In addition, the baseband subsystem may further be integrated into a SoC chip, and is manufactured and sold as the SoC chip. Software components of the baseband subsystem may be built in the hardware component before delivery, may be imported from another non-volatile memory into the hardware component after delivery, or may be downloaded and updated in an online manner through a network.

Figure 3:
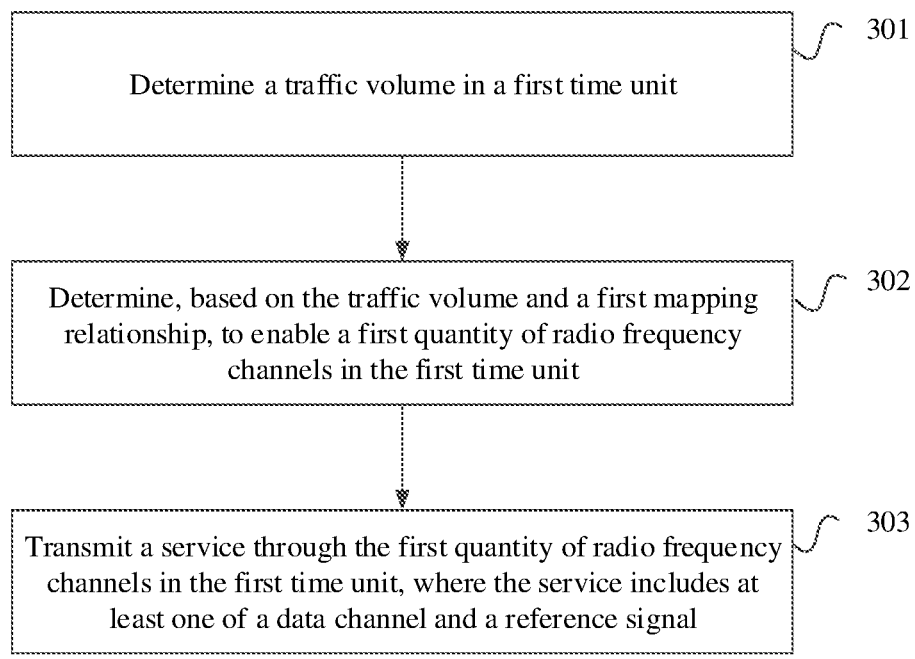
FIG. 3 is a schematic flowchart of a service transmission method according to an embodiment of this application.

With reference to the foregoing descriptions, FIG. 3 is a schematic flowchart of a service transmission method according to an embodiment of this application. The process shown in FIG. 3 may be executed by a network device. In FIG. 3, the method includes the following steps.

Step 301: Determine a traffic volume in a first time unit.

The first time unit may be a period of time, for example, measured in hours or minutes. For example, a time unit may be one hour, 10 hours, or 30 minutes. Alternatively, the first time unit may be measured in transmission time intervals (TTI), slots, subframes, symbols, radio frames, or the like. This is not limited in this embodiment of this application.

Further, how to specifically determine the traffic volume in the first time unit is not limited in this embodiment of this application. For example, the traffic volume in the first time unit may be predicted based on a traffic volume in historical data, or the traffic volume in the first time unit may be inferred using a neural network algorithm. Examples are not described one by one herein.

The first time unit may be specifically configured by the network device, or may be defined in a communication standard, or may be determined in another manner. Details are not described herein.

Step 302: Determine, based on the traffic volume and a first mapping relationship, to enable a first quantity of radio frequency channels in the first time unit.

The first mapping relationship includes a mapping relationship between a traffic volume and a quantity of radio frequency channels. A specific implementation of the first mapping relationship is not limited in this embodiment of this application, and will be described in a subsequent embodiment. Details are not described herein again.

It should be noted that, in this embodiment of this application, a smaller traffic volume indicates a smaller quantity of radio frequency channels that need to be enabled.

Step 303: Transmit a service through the first quantity of radio frequency channels in the first time unit, where the service includes at least one of a data channel and a reference signal.

The process shown in FIG. 3 may be applied to various different MIMO scenarios, which are separately described in the following.

Embodiment 1

In Embodiment 1, factors affecting communication transmission performance may be classified into at least two types: air interface transmission parameters specified in a standardized protocol, for example, configuration information of antenna ports; and implementation behavior that is of a network device or a terminal device and that does not need to be standardized. The former type of information needs to be notified by a network device to a terminal device, and MIMO transmission is implemented based on configurations of the antenna ports and configuration-based transmission modes. This type of information needs to be consistent between the network device and the terminal device. For the latter type of information, the network device or the terminal device may change implementations depending on capabilities of the network device or the terminal device. However, such implementation cannot affect the configuration parameters in the first type of information. For example, for configuration of a quantity of radio frequency channels, a quantity of radio frequency channels configured by the network device may be greater than a quantity of antenna ports configured using the air interface transmission parameters. For example, the quantity of radio frequency channels configured by the network device is 8, while the quantity of antenna ports configured on the air interface side is 4. In this case, two radio frequency channels may be mapped to one antenna port. In this way, power of a plurality of radio frequency channels may be used to send a signal corresponding to a same antenna port, to improve a signal-to-noise ratio of the signal and improve transmission performance.

However, when a traffic volume of a communication service decreases, if all radio frequency channels are enabled to send a signal, it is a waste of power. In an existing technology for disabling a radio frequency channel, it is generally required that signal sending of a corresponding antenna port is disabled while a radio frequency channel is disabled, to ensure consistency between an antenna port that disables a reference signal and an antenna port that disables a data channel. However, in some scenarios, a quantity of antenna ports cannot be reconfigured in time. Consequently, an antenna port actually used by the network device to send a signal does not match an antenna port determined by the terminal device, resulting in performance deterioration. Therefore, this embodiment of this application provides the following method for transmitting a service, so that no antenna port for sending a signal is disabled while some radio frequency channels are disabled to reduce power consumption, and it is ensured that based on remapping between the radio frequency channel and the antenna port, the antenna port actually used by the network device to send a signal matches the antenna port determined by the terminal device. This improves system performance when some channels are disabled. The following provides detailed descriptions with reference to the process shown in FIG. 3.

In step 302, the first mapping relationship may be implemented in a plurality of manners. In this embodiment of this application, a quantity of radio frequency channels that need to be enabled varies with a traffic volume falling within a different value range. In different value ranges, a smaller value range indicates a smaller quantity of radio frequency channels that need to be enabled.

For example, it is assumed that a quantity of radio frequency channels included in the network device is N, and N is an even number greater than 0, the first mapping relationship may be shown in Table 1.

TABLE 1

| Traffic volume | Quantity of to-be-enabled radio frequency channels |
|---|---|
| Greater than or equal to a second traffic volume threshold | N |
| Greater than a first traffic volume threshold and less than the second traffic volume threshold | N/2 |
| Less than or equal to the first traffic volume threshold | N/4 |

In Table 1, the first traffic volume threshold is less than the second traffic volume threshold. The first traffic volume threshold and the second traffic volume threshold may be configured by the network device, or may be defined in a communication standard, or may be determined in another manner. Details are not described herein.

Certainly, Table 1 is merely an example, and there may be another case in the first mapping relationship. This may be specifically deduced by analogy, and examples are not described one by one.

In another example, it is assumed that the network device includes eight radio frequency channels and is configured with four antenna ports. Traffic volumes may be classified into four levels: a first traffic volume threshold, a second traffic volume threshold, a third traffic volume threshold, and a fourth traffic volume threshold in ascending order. Correspondingly, quantities of to-be-enabled radio frequency channels may be respectively one radio frequency channel, two radio frequency channels, four radio frequency channels, and eight radio frequency channels.

In Embodiment 1, after the first quantity of radio frequency channels is determined, a second mapping relationship between the first quantity of radio frequency channels and a second quantity of antenna ports may be further determined, where the second quantity does not vary with the first quantity. For example, the second quantity may be a quantity of antenna ports configured by the network device, and may be a fixed value.

After the second mapping relationship is determined, a service corresponding to each antenna port may be transmitted based on the second mapping relationship through at least one radio frequency channel to which each of the second quantity of antenna ports is mapped.

In this embodiment of this application, the second mapping relationship includes a mapping relationship between any one of the second quantity of antenna ports and at least one of the first quantity of radio frequency channels. In the second mapping relationship, each of the second quantity of antenna ports is mapped to at least one radio frequency channel, and each of the first quantity of radio frequency channels is mapped to at least one antenna port.

Generally, different radio frequency channels correspond to different transmission channels. To ensure that a better diversity gain or multiplexing gain is obtained when MIMO transmission is used, it needs to be ensured that correlation between channel coefficients corresponding to different antenna ports is smaller. Correlation between different channel coefficients represents a similarity between the channel coefficients. Stronger correlation indicates that the channel coefficients are more identical, and otherwise, weaker correlation indicates that the channel coefficients are less identical. Therefore, in this embodiment of this application, the second mapping relationship may be determined based on the first quantity and the second quantity. The following describes different cases.

Case 1: The First Quantity is Greater than or Equal to the Second Quantity.

In this case, different antenna ports of the second quantity of antenna ports are mapped to different radio frequency channels.

When quantities of radio frequency channels to which two antenna ports are mapped are different, it may be considered that the two antenna ports are mapped to different radio frequency channels. When radio frequency channels to which the two antenna ports are mapped are not a same radio frequency channel, it may also be considered that the two antenna ports are mapped to different radio frequency channels.

Figure 4:
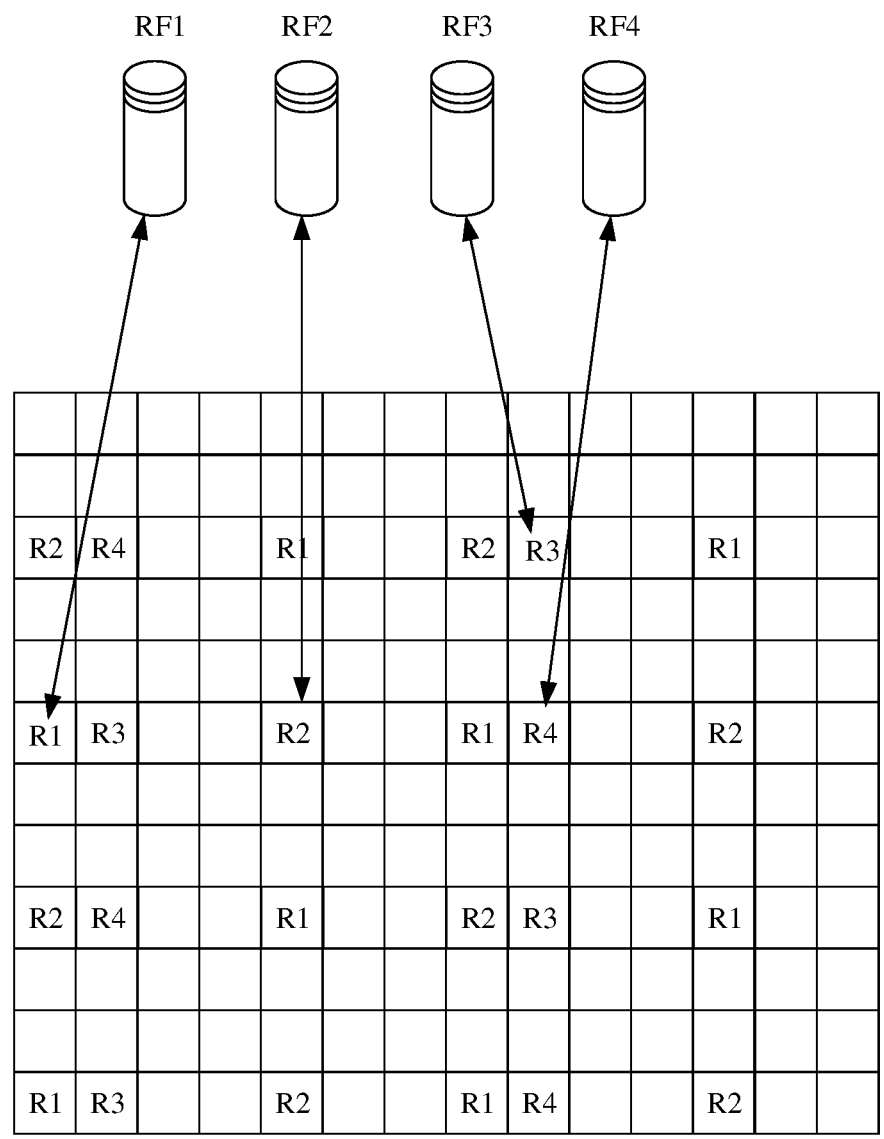
FIG. 4 is a schematic diagram of a mapping relationship between a radio frequency channel and an antenna port according to an embodiment of this application.

For example, it is assumed that the network device needs to enable four radio frequency channels: an RF1, an RF2, an RF3, and an RF4, and the network device is configured with four antenna ports: an R1, an R2, an R3, and an R4. In this case, the second mapping relationship may be that the R1 is mapped to the RF1, the R2 is mapped to the RF2, the R3 is mapped to the RF3, and the R4 is mapped to the RF4. Specifically, the second mapping relationship may be shown in FIG. 4 and Table 2.

TABLE 2

| Radio frequency channel | RF1 | RF2 | RF3 | RF4 |
|---|---|---|---|---|
| Antenna port | R1 | R2 | R3 | R4 |

With reference to Table 2, after the second mapping relationship shown in Table 2 is determined, a reference signal and a data channel that correspond to the R1 may be transmitted through the RF1, a reference signal and a data channel that correspond to the R2 may be transmitted through the RF2, a reference signal and a data channel that correspond to the R3 may be transmitted through the RF3, and a reference signal and a data channel that correspond to the R4 may be transmitted through the RF4. Another case is not described.

Case 2: The First Quantity is Less than the Second Quantity.

In this case, at least two of different antenna ports of the second quantity of antenna ports are mapped to a same radio frequency channel.

Further, when the first quantity is greater than 1, and the second quantity of antenna ports include at least two antenna ports for transmitting a diversity-based transmit data channel, each of the at least two antenna ports is mapped to a different radio frequency channel.

The at least two antenna ports for transmitting a diversity-based transmit data channel may indicate that the at least two antenna ports send same data streams.

For example, it is assumed that the network device includes four radio frequency channels: an RF1, an RF2, an RF3, and an RF4, and the network device is configured with four antenna ports: an R1, an R2, an R3, and an R4. A mapping relationship between a radio frequency channel and an antenna port may be shown in Table 1. It is assumed that the R1 and the R3 send same data streams, the R2 and the R4 send same data streams, and the R1 and the R2 send different data streams. In this scenario, the R1 and the R3 are antenna ports for transmitting a diversity-based transmit data channel, and the R2 and the R4 are antenna ports for transmitting a diversity-based transmit data channel.

Figure 5:
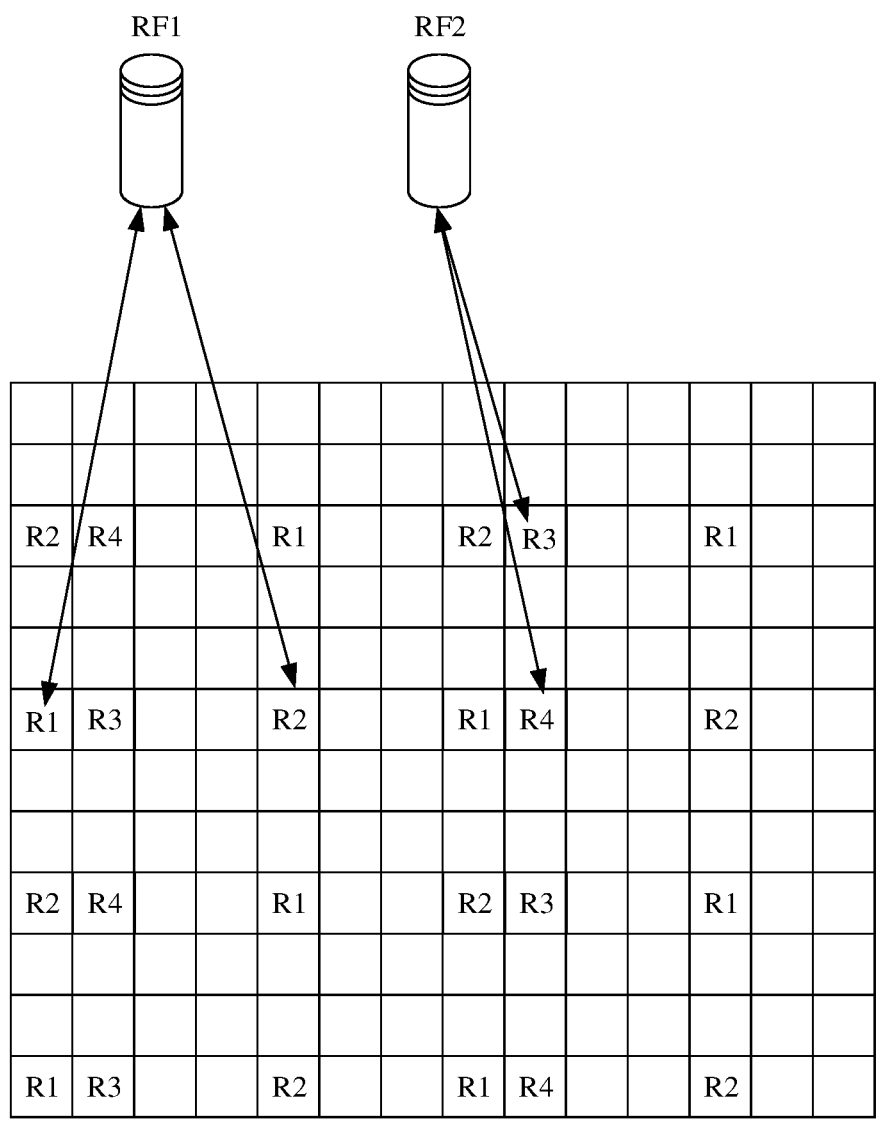
FIG. 5 is a schematic diagram of a mapping relationship between a radio frequency channel and an antenna port according to an embodiment of this application.

With reference to the foregoing example, when it is determined that only two of the four radio frequency channels are enabled, the R1 and the R3 need to be mapped to different radio frequency channels, and the R2 and the R4 need to be mapped to different radio frequency channels. It is assumed that the enabled radio frequency channels are the RF1 and the RF2. In this case, the second mapping relationship may be that the R1 is mapped to the RF1, the R2 is mapped to the RF1, the R3 is mapped to the RF2, and the R4 is mapped to the RF2. Specifically, the second mapping relationship may be shown in FIG. 5 and Table 3.

TABLE 3

| Radio frequency channel | RF1 | RF1 | RF2 | RF2 |
|---|---|---|---|---|
| Antenna port | R1 | R2 | R3 | R4 |

With reference to Table 3, after the second mapping relationship shown in Table 3 is determined, a reference signal and a data channel that correspond to the R1 and a reference signal and a data channel that correspond to the R2 may be transmitted through the RF1, and a reference signal and a data channel that correspond to the R3 and a reference signal and a data channel that correspond to the R4 may be transmitted through the RF2.

Certainly, in the foregoing example, the R1 and the R2 may alternatively be mapped to the RF2, and the R3 and the R4 may alternatively be mapped to the RF1.

Optionally, in Case 1 and Case 2, mapping relationships between different antenna ports and different radio frequency channels may be represented by a same group of radio frequency channels and different combination coefficients. For example, a mapping relationship between a port R1 numbered i (i=1, 2, 3, 4) and a channel $RF_j$ numbered j (j=1, 2, . . . , 8) is $R_i=\Sigma_j \alpha_{ij} RF_j$, (j=1, 2, . . . , 8), where $\alpha_{ij}$ is a mapping coefficient between a $j^{th}$ channel and an $i^{th}$ port, and is usually a complex number. The mapping relationship represents that some data of the antenna port $R_i$ is processed by using the mapping coefficient $\alpha_{ij}$ and then is sent through the channel $RF_j$.

Further, in Case 2, when the first quantity of radio frequency channels is equal to 1, all the second quantity of antenna ports are mapped to this radio frequency channel. In this case, reference signals and data channels that correspond to all different antenna ports are sent through a same radio frequency channel.

Figure 6:
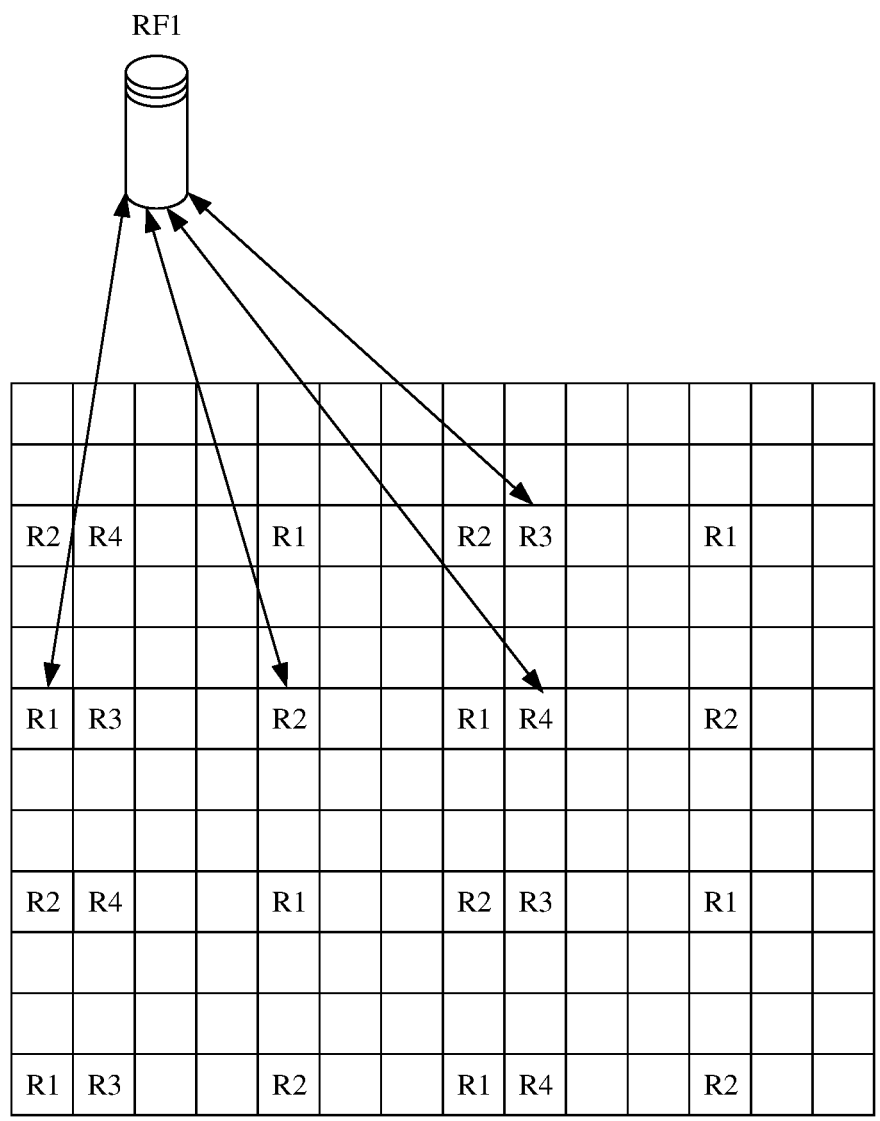
FIG. 6 is a schematic diagram of a mapping relationship between a radio frequency channel and an antenna port according to an embodiment of this application.

With reference to the foregoing example, when it is determined that only the RF1 in the four radio frequency channels is enabled, the R1, the R2, the R3, and the R4 are all mapped to the RF1, the R3 is mapped to the RF2, and the R4 is mapped to the RF2. Specifically, the second mapping relationship may be shown in FIG. 6 and Table 4.

TABLE 4

| Radio frequency channel | RF1 | RF1 | RF1 | RF1 |
|---|---|---|---|---|
| Antenna port | R1 | R2 | R3 | R4 |

With reference to Table 4, after the second mapping relationship shown in Table 4 is determined, a reference signal and a data channel that correspond to the R1, a reference signal and a data channel that correspond to the R2, a reference signal and a data channel that correspond to the R3, and a reference signal and a data channel that correspond to the R4 may be transmitted through the RF1.

Further, in Embodiment 1, to ensure that transmission performance is unaffected before and after a radio frequency channel is disabled, it is necessary to keep a power of a reference signal covered per unit resource unchanged. In this way, a total power per unit resource corresponding to a service corresponding to an antenna port remains unchanged, and the total power is provided by powers of a plurality of radio frequency channels corresponding to the antenna port.

For example, in a MIMO system with eight radio frequency channels and four antenna ports (8T4P) shown in Table 5(a), T represents a channel, and P represents an antenna port. The network device is configured with eight radio frequency channels and four antenna ports. When all the eight radio frequency channels are enabled, a power provided by each radio frequency channel per unit resource of an antenna port mapped the radio frequency channel is $P_o$. Correspondingly, a total power of a reference signal that corresponds to each antenna port per unit resource is $2P_o$, where a power for one antenna port is provided by two radio frequency channels. After half of the radio frequency channels are disabled, four radio frequency channels and four antenna ports (4T4P) are available. In this case, each antenna port is mapped to one radio frequency channel. Therefore, a power for each antenna port is provided by only one radio frequency channel. To ensure that the total power of the reference signal that corresponds to each antenna port per unit resource remains unchanged, a power that is provided by each radio frequency channel for a reference signal sent by an antenna port mapped to the radio frequency channel per unit resource is $2P_o$. For details, refer to Table 5(a).

Further, when ¾ of the radio frequency channels are disabled, two radio frequency channels and four antenna ports (2T4P) are available. In this case, one radio frequency channel needs to provide a power for services sent by two corresponding antenna ports. To ensure that the total power of the reference signal that corresponds to each antenna port per unit resource remains unchanged, a power provided by each radio frequency channel for a reference signal sent by an antenna port mapped to the radio frequency channel is $2P_o$. Further, when ⅞ of the radio frequency channels are disabled, one radio frequency channels and four antenna ports (1T4P) are available. In this case, one radio frequency channel needs to provide a power for reference signals sent by four corresponding antenna ports, and a power provided by each radio frequency channel for a reference signal sent by an antenna port mapped to the radio frequency channel is $2P_o$. For details, refer to Table 5(b).

TABLE 5(a)

| 8T4P | | | | | | | | 4T4P | | | |
|---|---|---|---|---|---|---|---|---|---|---|---|
| RF1 | RF2 | RF3 | RF4 | RF5 | RF6 | RF7 | RF9 | RF1 | RF2 | RF3 | RF4 |
| R1 | R1 | R2 | R2 | R3 | R3 | R4 | R4 | R1 | R2 | R3 | R4 |
| $P_o$ | $P_o$ | $P_o$ | $P_o$ | $P_o$ | $P_o$ | $P_o$ | $P_o$ | $2P_o$ | $2P_o$ | $2P_o$ | $2P_o$ |

TABLE 5(b)

| 2T4P | | | | 1T4P | | | |
|---|---|---|---|---|---|---|---|
| RF1 | RF2 | RF1 | RF2 | RF1 | RF1 | RF1 | RF1 |
| R1 | R2 | R3 | R4 | R1 | R2 | R3 | R4 |
| $2P_o$ | $2P_o$ | $2P_o$ | $2P_o$ | $2P_o$ | $2P_o$ | $2P_o$ | $2P_o$ |

According to the foregoing embodiment, a quantity of to-be-enabled radio frequency channels can be determined based on the traffic volume, to reduce power consumption of the network device. Further, in a case that only some radio frequency channels are enabled, a MIMO transmission mode, including diversity and spatial multiplexing, may still be supported, and it is ensured that cell coverage performance is unaffected, so that service transmission performance may not be deteriorates.

In addition, after some radio frequency channels are disabled, the antenna port of the network device still sends a corresponding service over a mapped radio frequency channel. Therefore, the network device does not need to notify the terminal device of which radio frequency channels of the antenna ports are disabled, and does not need to reconfigure any antenna port parameter or transmission mode. Further, after some radio frequency channels are disabled for the network device, the antenna port can still send a service. Therefore, the network device does not need to be restarted either.

Embodiment 2

In an existing technology for disabling a radio frequency channel, it is generally required that a corresponding antenna port is disabled while a radio frequency channel is disabled, to ensure consistency between an antenna port that disables a reference signal and an antenna port that disables a data channel. Such a manner of disabling a radio frequency channel generally becomes effective based on reconfiguration or remapping of an antenna port. However, the effective time is long and therefore this manner is not applicable to a phase of communication busy hours. The "communication busy hour" is generally defined as that an average resource utilization of a communication coefficient in a period of time exceeds a threshold, for example, a physical resource block utilization exceeds 50%.

However, even in the communication busy hour, services in a unit time resource fluctuate. For example, there are light-load services in some unit time resources in different subframes or transmission time intervals. As a result, transmission capabilities of high-order MIMO in these unit time become redundant. Therefore, some radio frequency channels may be disabled to save energy.

In this scenario, if a radio frequency channel corresponding to the reference signal changes, but the antenna port does not change, channel quality of a terminal device decreases, and consequently subsequent transmission efficiency decreases. Therefore, this embodiment of this application provides a method for disabling a radio frequency channel, in which an antenna port disables a reference signal and an antenna port disables a data channel are inconsistent, to avoid impact on measuring the reference signal by the terminal device, and save energy by disabling the radio frequency channel corresponding to the data channel. It should be noted that, in case of light-load services, another transmission means (for example, adaptive coding and modulation) may be used for compensation, to ensure accurate transmission of the light-load services in a unit time resource, so as to ensure accurate transmission in the unit time resource and implement energy saving in case of disabling channels. The following provides detailed descriptions with reference to the process shown in FIG. 3.

In step 301, the first time unit may be measured in transmission time intervals (TTI), slots, subframes, symbols, radio frames, or the like.

In Embodiment 2, radio frequency channels included in the network device may be divided into at least two radio frequency channel groups. The following uses an example in which radio frequency channels are divided into two radio frequency channel groups for description, and other cases may be deduced by analogy.

In case of dividing the radio frequency channels included in the network device into a first radio frequency channel group and a second radio frequency channel group, the second radio frequency channel group may be a subset of the first radio frequency channel group. Radio frequency channels included in the second radio frequency channel group are radio frequency channels shared by the first radio frequency channel group and the second radio frequency channel group, and a quantity of radio frequency channels included in the first radio frequency channel group is greater than a quantity of radio frequency channels included in the second radio frequency channel group.

Optionally, the radio frequency channels in the first radio frequency channel group are all radio frequency channels included in the network device.

For example, the network device includes eight radio frequency channels, the first radio frequency channel group may include all the eight radio frequency channels included in the network device, and the radio frequency channels included in the second radio frequency channel group may be any four of the eight radio frequency channels.

In this embodiment of this application, to ensure normal service transmission, a quantity of enabled radio frequency channels to which different traffic volumes are mapped, that is, the first mapping relationship, may be shown in Table 6.

TABLE 6

| Traffic volume | Quantity of to-be-enabled radio frequency channels |
|---|---|
| Less than a first threshold | Enable the first radio frequency channel group or the second radio frequency channel group |
| Greater than or equal to the first threshold | Enable the first radio frequency channel group |

With reference to Table 6, if the traffic volume in the first time unit is less than the first threshold, the first radio frequency channel group or the second radio frequency channel group is enabled in the first time unit. If the traffic volume in the first time unit is greater than or equal to the first threshold, the second radio frequency channel group is enabled in the first time unit.

A specific value of the first threshold may be determined depending on an actual situation. This is not limited in this embodiment of this application.

Further, with reference to the foregoing description, in the first time unit, the reference signal or the data channel may be transmitted according to the following method: if the traffic volume in the first time unit is greater than or equal to the first threshold, enabling the first radio frequency channel group in the first time unit, and sending the reference signal and the data channel through a first antenna port group corresponding to the first radio frequency channel group; and if the traffic volume in the first time unit is less than the first threshold, when a reference signal needs to be sent in the first time unit, enabling the first radio frequency channel group, and sending the reference signal through a first antenna port group corresponding to the first radio frequency channel group; and when a data channel needs to be sent in the first time unit, enabling the second radio frequency channel group, and sending the data channel through a second antenna port group corresponding to the second radio frequency channel group.

The first antenna port group and the second antenna port group each includes at least one antenna port. The second antenna port group is a subset of the first antenna port group, that is, any antenna port in the second antenna port group belongs to the first antenna port group, and the first antenna port group includes at least one antenna port that does not belong to the second antenna port group.

Figure 7:
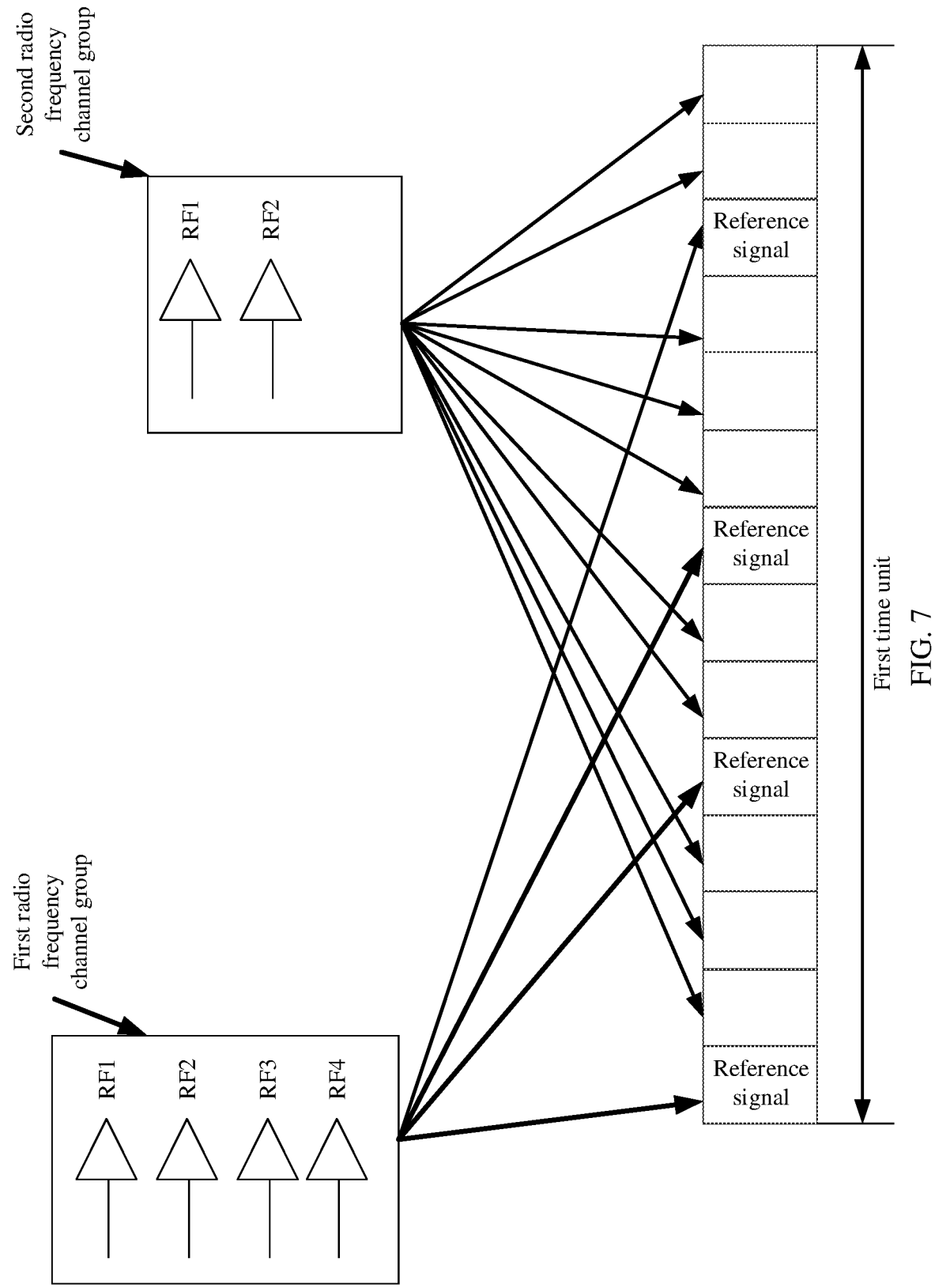
FIG. 7 is a schematic diagram of service transmission of a radio frequency channel group according to an embodiment of this application.

For example, as shown in FIG. 7, the first time unit is a subframe including 14 orthogonal frequency division multiplexing (OFDM) symbols. The 14 OFDM symbols are respectively a symbol 0 to a symbol 13 in a time sequence. A reference signal needs to be sent on the symbol 0, the symbol 4, the symbol 7, and the symbol 11.

Assuming that it is currently determined that the traffic volume in the first time unit is less than the first threshold, with reference to Table 6, it may be determined that the first radio frequency channel group or the second radio frequency channel group needs to be enabled. It is assumed that the first radio frequency channel group includes four radio frequency channels: an RF1, an RF2, an RF3, and an RF4, and the second radio frequency channel group includes two radio frequency channels: an RF1 and an RF2. In this case, the first radio frequency channel group may be enabled for the symbol 0, the symbol 4, the symbol 7, and the symbol 11 in the first time unit, and the reference signal is sent through the first radio frequency channel group. Only the second radio frequency channel group may be enabled for symbols other than the symbol 0, the symbol 4, the symbol 7, and the symbol 11 in the first time unit, and the data channel is sent through the second radio frequency channel group. In addition, if some frequency domain resources in OFDM symbols (the symbol 0, the symbol 4, the symbol 7, and the symbol 11) on which the reference signal is located are also used to send the data channel, a radio frequency channel for sending the data channel on the some frequency domain resources is the same as a radio frequency channel used by another OFDM symbol for sending the data channel.

It should be noted that, in Embodiment 2, if a quantity of radio frequency channels (or a quantity of antenna ports) for sending a data channel is different from a quantity of radio frequency channels (or a quantity of antenna ports) for sending a reference signal, mismatch occurs during channel estimation, resulting in deterioration of network transmission performance. For example, a terminal device configured with four antenna ports and a transmission mode TM4 still performs channel measurement and precoding matrix index feedback based on four antenna ports, and a precoding length used when the data channel is received is 4. However, the network device actually uses two antenna ports to send the data channel. Therefore, a precoding length on the transmitter side is 2. Generally, the network device sends a reference signal based on an antenna port group corresponding to the first radio frequency channel group, sends a data channel based on an antenna port group corresponding to the second radio frequency channel group, and determines a precoding length based on a quantity of antenna ports corresponding to the second radio frequency channel group, to send the data channel.

It can be learned from the foregoing process that the to-be-enabled radio frequency channel is determined based on the traffic volume in the first time unit, and the quantity of radio frequency channels for sending the reference signal is different from the quantity of radio frequency channels for sending the data channel. Regardless of a value of the traffic volume, the quantity of radio frequency channels for sending the reference signal always remains unchanged. Therefore, it may be ensured that when some radio frequency channels are disabled, the traffic volume in the current first time unit is met, sending of the reference signal is unaffected, quality of measurement performed by the terminal device on the reference signal is unaffected, and a high traffic volume requirement for subsequent transmission is ensured.

Embodiment 3

With the diversification of services and the demand for large capacity in a wireless communication network, aggregation of large-capacity transmission based on a plurality of cells (which may be a plurality of cells corresponding to a same frequency or a plurality of cells corresponding to different frequencies) has become one of key technologies. To implement simple or cost-effective deployment on a network side, sharing can be implemented based on radio frequency channels corresponding to a plurality of cells. However, due to different requirements in traffic volumes between cells, different cells have different requirements for a quantity of radio frequency channels or a quantity of antenna ports in actual transmission, so that shared radio frequency channels are redundant for some cells. Therefore, during transmission, radio frequency channels of some cells may be disabled to implement energy saving. The following provides detailed descriptions with reference to the process shown in FIG. 3.

In Embodiment 3, the network device may simultaneously configure a plurality of cells through carrier aggregation or in other manners. The following uses an example in which a first cell and a second cell are included for description, and other cases may be deduced by analogy.

It should be noted that the first cell and the second cell are not limited in this embodiment of this application. For example, the first cell may be an LTE cell, and the second cell may be an NB-IoT cell.

When the first cell and the second cell belong to a same network device, in step 301, the determined traffic volume in the first time unit may include a first traffic volume of the first cell and a second traffic volume of the second cell.

In Embodiment 3, radio frequency channels included in the network device may be divided into at least two radio frequency channel groups. The following uses an example in which radio frequency channels are divided into two radio frequency channel groups for description, and other cases may be deduced by analogy.

In case of dividing the radio frequency channels included in the network device into a third radio frequency channel group and a fourth radio frequency channel group, the fourth radio frequency channel group may be a subset of the third radio frequency channel group. Radio frequency channels included in the fourth radio frequency channel group are radio frequency channels shared by the third radio frequency channel group and the fourth radio frequency channel group, and a quantity of radio frequency channels included in the third radio frequency channel group is greater than a quantity of radio frequency channels included in the fourth radio frequency channel group.

Optionally, the radio frequency channels in the third radio frequency channel group are all radio frequency channels included in the network device.

For example, the network device includes four radio frequency channels, the third radio frequency channel group may include all the four radio frequency channels included in the network device, and the radio frequency channels included in the fourth radio frequency channel group may be any two of the four radio frequency channels.

With reference to the foregoing description, in Embodiment 3, the first mapping relationship may be shown in Table 7.

TABLE 7

| Traffic volume | Quantity of to-be-enabled radio frequency channels |
|---|---|
| At least one of the first traffic volume and the second traffic volume is greater than or equal to a second threshold | Enable the third radio frequency channel group |
| Both the first traffic volume and the second traffic volume are less than the second threshold | Enable the fourth radio frequency channel group |

In Table 7, a specific value of the second threshold may be determined depending on an actual situation. This is not limited in this embodiment of this application.

Table 7 is merely an example, and there may be another first mapping relationship. Examples are not described one by one herein.

With reference to Table 7, if at least one of the first traffic volume and the second traffic volume is greater than or equal to the second threshold, the third radio frequency channel group is to be enabled in the first time unit. If both the first traffic volume and the second traffic volume are less than the second threshold, the fourth radio frequency channel group is to be enabled in the first time unit.

Further, when the third radio frequency channel group is to be enabled in the first time unit, at least one of a service of the first cell and a service of the second cell may be sent in the first time unit through the third radio frequency channel group.

When the fourth radio frequency channel group is enabled in the first time unit, at least one of a service of the first cell and a service of the second cell may be sent in the first time unit through the fourth radio frequency channel group.

Figure 8:
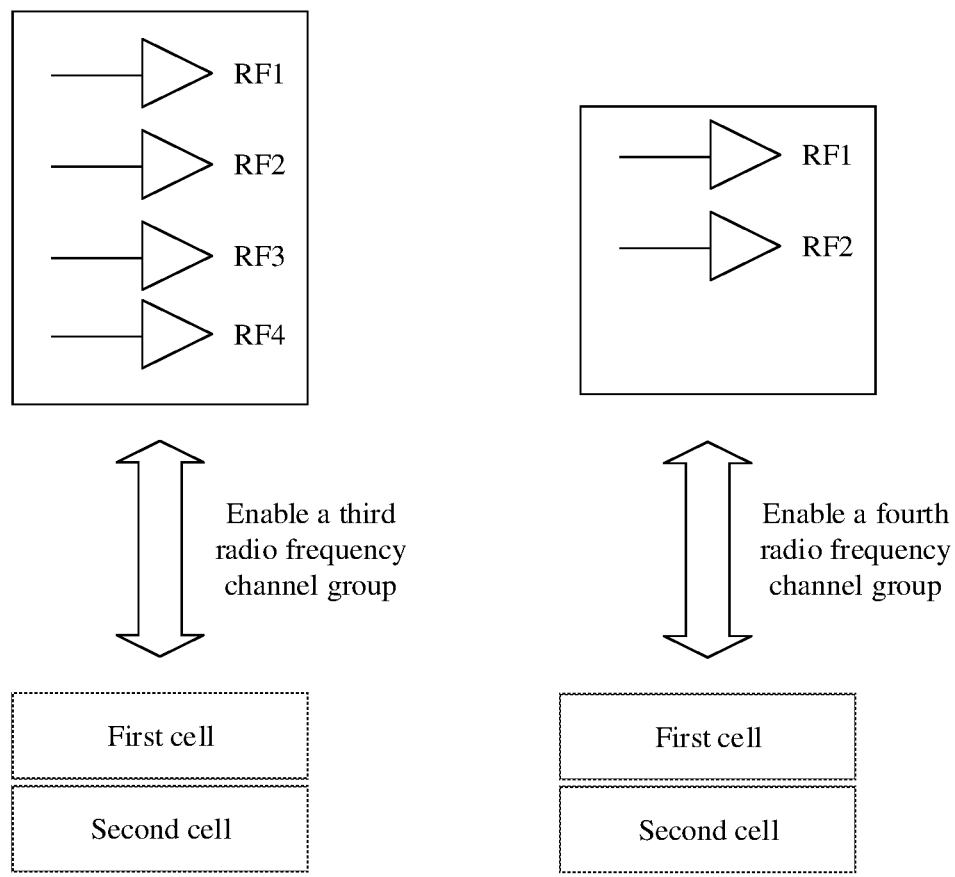
FIG. 8 is a schematic diagram of service transmission of a radio frequency channel group according to an embodiment of this application.

For example, with reference to FIG. 8, the network device includes four radio frequency channels: an RF1, an RF2, an RF3, and an RF4. The third radio frequency channel group may include all the four radio frequency channels included in the network device, and the radio frequency channels included in the fourth radio frequency channel group may be an RF1 and an RF2.

In the first time unit, when at least one of the first traffic volume of the first cell and the second traffic volume of the second cell is greater than or equal to the second threshold, the third radio frequency channel group may be enabled, that is, the RF1, the RF2, the RF3, and the RF4 are enabled. Correspondingly, in the first time unit, at least one of the service of the first cell and the service of the second cell may be sent through the RF1, the RF2, the RF3, and the RF4.

In the first time unit, when both the first traffic volume of the first cell and the second traffic volume of the second cell are less than the second threshold, the fourth radio frequency channel group may be enabled, that is, the RF1 and the RF2 are enabled. Correspondingly, in the first time unit, at least one of the service of the first cell and the service of the second cell may be sent through the RF1 and the RF2.

Embodiment 1 to Embodiment 3 may be applied to downlink transmission. When Embodiment 1 to Embodiment 3 are applied to downlink transmission, the service transmitted in Embodiment 1 to Embodiment 3 is a downlink service, and the radio frequency channel is a radio frequency transmit channel. Modules that may be included in the radio frequency channel include but are not limited to one or more of the following: a power amplifier, a low noise amplifier, a digital-to-analog converter, and a radio frequency signal processing unit.

Embodiment 4

With gradual improvement of capabilities of MIMO in a communication system, a quantity of radio frequency receive channels accordingly increases. As a result, power consumption of the network device gradually increases. Some hardware units corresponding to the radio frequency receive channels are mainly a low noise amplifier and a radio frequency chip. Therefore, an embodiment of this application provides a method to reduce power consumption of a radio frequency receive channel. The following provides detailed descriptions with reference to the process shown in FIG. 3.

In Embodiment 4, radio frequency channels included in the network device may be divided into at least two radio frequency channel groups. The following uses an example in which radio frequency channels are divided into three radio frequency channel groups for description, and other cases may be deduced by analogy.

In case of dividing the radio frequency channels included in the network device into a fifth radio frequency channel group, a sixth radio frequency channel group, and a seventh radio frequency channel group, the sixth radio frequency channel group may be a subset of the fifth radio frequency channel group, and the seventh radio frequency channel group may be a subset of the sixth radio frequency channel group.

Specifically, radio frequency channels included in the sixth radio frequency channel group are radio frequency channels shared by the fifth radio frequency channel group and the sixth radio frequency channel group, and a quantity of radio frequency channels included in the fifth radio frequency channel group is greater than a quantity of radio frequency channels included in the sixth radio frequency channel group. Radio frequency channels included in the seventh radio frequency channel group are radio frequency channels shared by the sixth radio frequency channel group and the seventh radio frequency channel group, and the quantity of radio frequency channels included in the sixth radio frequency channel group is greater than a quantity of radio frequency channels included in the seventh radio frequency channel group.

Optionally, the radio frequency channels in the fifth radio frequency channel group are all radio frequency channels included in the network device.

For example, the network device includes eight radio frequency channels, the fifth radio frequency channel group may include all the eight radio frequency channels included in the network device, the radio frequency channels included in the sixth radio frequency channel group may be any four of the eight radio frequency channels, and the radio frequency channels included in the seventh radio frequency channel group may be any two radio frequency channels included in the sixth radio frequency channel group.

With reference to the foregoing description, in Embodiment 4, the first mapping relationship may be as follows:
if the traffic volume is greater than or equal to a second threshold, the fifth radio frequency channel group is to be enabled;
if the traffic volume is greater than a first threshold and less than the second threshold, the sixth radio frequency channel group is to be enabled; and
if the traffic volume is less than or equal to the first threshold, the seventh radio frequency channel group is to be enabled.

The foregoing is merely an example, and there may be another first mapping relationship. Examples are not described one by one herein.

Further, when the fifth radio frequency channel group is enabled in the first time unit, the service may be transmitted through the fifth radio frequency channel group.

When the sixth radio frequency channel group is enabled in the first time unit, the service may be transmitted through the sixth radio frequency channel group.

When the seventh radio frequency channel group is enabled in the first time unit, the service may be transmitted through the seventh radio frequency channel group.

According to the foregoing method, the network device may adaptively adjust a quantity of to-be-enabled radio frequency channels based on the traffic volume in the first time unit, to reduce power consumption of the network device and save energy.

Embodiment 4 may be applied to downlink transmission. When Embodiment 4 is applied to uplink transmission, the service transmitted in Embodiment 4 is an uplink service, and the radio frequency channel is a radio frequency receive channel. Modules that may be included in the radio frequency channel include but are not limited to one or more of the following: a small-signal amplifier, a low noise amplifier, an analog-to-digital converter, and a radio frequency signal processing unit.

It should be noted that Embodiment 1 to Embodiment 4 may be independent embodiments, or may be combined based on internal logic. For example, Embodiment 1 and Embodiment 2 are combined into one embodiment. All these solutions fall within the protection scope of this application.

Embodiments described in this specification may be independent solutions, or may be combined based on internal logic. All these solutions fall within the protection scope of this application.

It may be understood that in the foregoing method embodiments, the methods and operations implemented by the network device may alternatively be implemented by a component (for example, a chip or a circuit) that can be used in the network device.

To implement functions in the method provided in the foregoing embodiments of this application, the network device may include a hardware structure and/or a software module, and implement the foregoing functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

Division into modules in embodiments of this application is an example, and is merely logical function division. During actual implementation, there may be another division manner. In addition, functional modules in embodiments of this application may be integrated into one processor, or may exist alone physically, or two or more modules are integrated into one module. The integrated module may be implemented in a form of hardware, or may be implemented in a form of a software functional module.

Figure 9:
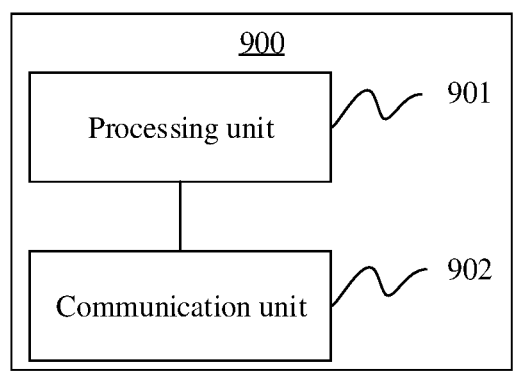
FIG. 9 is a schematic diagram of a structure of a communication apparatus according to an embodiment of this application.

Same as the foregoing concept, as shown in FIG. 9, an embodiment of this application further provides an apparatus 900, configured to implement functions of the network device in the foregoing method. For example, the apparatus may be a software module or a chip system. In this embodiment of this application, the chip system may include a chip, or may include the chip and another discrete component. The apparatus 900 may include a processing unit 901 and a communication unit 902.

In this embodiment of this application, the communication unit may also be referred to as a transceiver unit, and may include a sending unit and/or a receiving unit, which are respectively configured to perform the steps of sending and receiving by the network device in the foregoing method embodiments.

Communication apparatuses provided in embodiments of this application are described in detail with reference to FIG. 9 and FIG. 10. It should be understood that descriptions of the apparatus embodiments correspond to the descriptions of the method embodiments. Therefore, for content that is not described in detail, refer to the foregoing method embodiments. For brevity, details are not described herein again.

The processing unit 901 is configured to determine a traffic volume in a first time unit; determine, based on the traffic volume and a first mapping relationship, to enable a first quantity of radio frequency channels in the first time unit, where the first mapping relationship includes a mapping relationship between the traffic volume and a quantity of radio frequency channels.

The communication unit 902 is configured to transmit a service through the first quantity of radio frequency channels in the first time unit, where the service includes at least one of a data channel and a reference signal.

In a possible design, before the service is transmitted through the first quantity of radio frequency channels, the processing unit 901 is further configured to:
determine a second mapping relationship between the first quantity of radio frequency channels and a second quantity of antenna ports, where the second quantity does not vary with the first quantity.

In a possible design, the second mapping relationship includes a mapping relationship between any one of the second quantity of antenna ports and at least one of the first quantity of radio frequency channels.

When the first quantity is greater than or equal to the second quantity, different antenna ports of the second quantity of antenna ports are mapped to different radio frequency channels.

Alternatively, when the first quantity is less than the second quantity, at least two of different antenna ports of the second quantity of antenna ports are mapped to a same radio frequency channel.

In a possible design, when the first quantity is less than the second quantity, when the first quantity is greater than 1, and the second quantity of antenna ports include at least two antenna ports for transmitting a diversity-based transmit data channel, each of the at least two antenna ports is mapped to a different radio frequency channel.

In a possible design, the communication unit 902 is specifically configured to: transmit, based on the second mapping relationship through at least one radio frequency channel to which each of the second quantity of antenna ports is mapped, a service corresponding to each antenna port.

In a possible design, the first quantity of radio frequency channels is a quantity of radio frequency channels included in a second radio frequency channel group or a quantity of radio frequency channels included in a first radio frequency channel group.

The processing unit 901 is specifically configured to:
if the traffic volume is less than a first threshold, enable the first radio frequency channel group or the second radio frequency channel group in the first time unit; and
if the traffic volume is greater than or equal to the first threshold, enable the first radio frequency channel group in the first time unit, where
the radio frequency channels included in the second radio frequency channel group are radio frequency channels shared by the first radio frequency channel group and the second radio frequency channel group, and the quantity of radio frequency channels included in the first radio frequency channel group is greater than the quantity of radio frequency channels included in the second radio frequency channel group.

In a possible design, the communication unit 902 is specifically configured to:
if the traffic volume is less than the first threshold, send the reference signal through a first antenna port group corresponding to the first radio frequency channel group in the first time unit; and send a data channel in the first time unit through a second antenna port group corresponding to the second radio frequency channel group.

In a possible design, the communication unit 902 is specifically configured to: if the traffic volume is greater than or equal to the first threshold, send the reference signal and the data channel in the first time unit through the first antenna port group corresponding to the first radio frequency channel group.

In a possible design, any antenna port in the second antenna port group belongs to the first antenna port group, and the first antenna port group includes at least one antenna port that does not belong to the second antenna port group, where one antenna port group includes at least one antenna port.

In a possible design, the traffic volume includes a first traffic volume of a first cell and a second traffic volume of a second cell. The first cell and the second cell belong to a same network device.

In a possible design, the first quantity of radio frequency channels is a quantity of radio frequency channels included in a fourth radio frequency channel group or a quantity of radio frequency channels included in a third radio frequency channel group.

The processing unit 901 is specifically configured to:
if at least one of the first traffic volume and the second traffic volume is greater than or equal to a second threshold, enable the third radio frequency channel group in the first time unit; and
if both the first traffic volume and the second traffic volume are less than the second threshold, enable the fourth radio frequency channel group in the first time unit, where
the radio frequency channels included in the fourth radio frequency channel group are radio frequency channels shared by the third radio frequency channel group and the fourth radio frequency channel group, and the quantity of radio frequency channels included in the third radio frequency channel group is greater than the quantity of radio frequency channels included in the fourth radio frequency channel group.

In a possible design, the communication unit 902 is specifically configured to:
when the third radio frequency channel group is enabled in the first time unit, send a service of the first cell and/or a service of the second cell through the third radio frequency channel group; or
when the fourth radio frequency channel group is enabled in the first time unit, send a service of the first cell and/or a service of the second cell through the fourth radio frequency channel group.

In a possible design, the first quantity of radio frequency channels is a quantity of radio frequency channels included in a fifth radio frequency channel group, or a quantity of radio frequency channels included in a sixth radio frequency channel group, or a quantity of radio frequency channels included in a seventh radio frequency channel group.

The processing unit 901 is specifically configured to:
if the traffic volume is greater than or equal to a second threshold, enable the fifth radio frequency channel group;
if the traffic volume is greater than the first threshold and less than the second threshold, enable the sixth radio frequency channel group; and
if the traffic volume is less than or equal to the first threshold, enable the seventh radio frequency channel group, where
all radio frequency channels included in the sixth radio frequency channel group belong to the fifth radio frequency channel group, and the quantity of radio frequency channels included in the fifth radio frequency channel group is greater than the quantity of radio frequency channels included in the sixth radio frequency channel group; and
all radio frequency channels included in the seventh radio frequency channel group belong to the fifth radio frequency channel group, and the quantity of radio frequency channels included in the sixth radio frequency channel group is greater than the quantity of radio frequency channels included in the seventh radio frequency channel group.

In a possible design, the communication unit 902 is specifically configured to:
when the fifth radio frequency channel group is enabled in the first time unit, transmit the service through the fifth radio frequency channel group;
when the sixth radio frequency channel group is enabled in the first time unit, transmit the service through the sixth radio frequency channel group; or
when the seventh radio frequency channel group is enabled in the first time unit, transmit the service through the seventh radio frequency channel group.

In a possible design, when the service is a downlink service, the radio frequency channel includes at least one of a power amplifier, a low noise amplifier, a digital-to-analog converter, and a radio frequency signal processing unit.

Alternatively, when the service is an uplink service, the radio frequency channel includes at least one of a small-signal amplifier, a low noise amplifier, an analog-to-digital converter, and a radio frequency signal processing unit.

Figure 10:
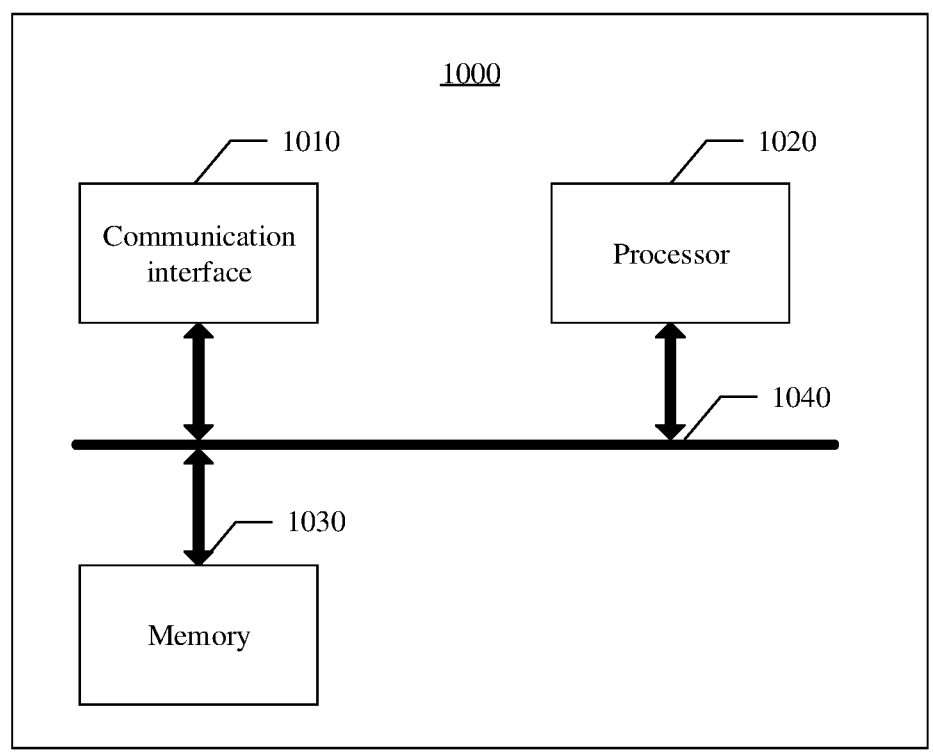
FIG. 10 is a schematic diagram of a structure of a communication apparatus according to an embodiment of this application.

FIG. 10 shows an apparatus 1000 according to an embodiment of this application. The apparatus shown in FIG. 10 may be an implementation of a hardware circuit of the apparatus shown in FIG. 9. The communication apparatus is applicable to the foregoing flowchart, and performs functions of the network device in the foregoing method embodiments. For ease of description, FIG. 10 shows only main components of the communication apparatus.

The apparatus 1000 shown in FIG. 10 includes at least one processor 1020, configured to implement any method implemented by the network device provided in embodiments of this application.

The apparatus 1000 may further include at least one memory 1030, configured to store program instructions and/or data. The memory 1030 is coupled to the processor 1020. The coupling in embodiments of this application is an indirect coupling or a communication connection between apparatuses, units, or modules in an electrical form, a mechanical form, or another form, and is used for information exchange between the apparatuses, the units, or the modules. The processor 1020 may operate in collaboration with the memory 1030. The processor 1020 may execute the program instructions stored in the memory 1030. At least one of the at least one memory may be included in the processor.

It should be noted that, the processor in this embodiment of this application may be an integrated circuit chip, and has a signal processing capability. In an implementation process, steps of the foregoing method embodiments may be completed using a hardware integrated logical circuit in the processor, or using instructions in a form of software. The foregoing processor may be a general-purpose processor, a digital signal processing circuit (DSP), an application-specific integrated circuit (ASIC), a field programmable gate array (FPGA), another programmable logic device, a discrete gate or transistor logic device, or a discrete hardware component.

It may be understood that the memory in embodiments of this application may be a volatile memory or a non-volatile memory, or may include a volatile memory and a non-volatile memory. It should be noted that the memory of the systems and methods described in this specification includes but is not limited to these and any memory of another appropriate type.

The apparatus 1000 may further include a communication interface 1010, configured to communicate with another device through a transmission medium, so that an apparatus in the apparatus 1000 can communicate with the another device. In this embodiment of this application, the communication interface may be a transceiver, a circuit, a bus, a module, or a communication interface of another type. In this embodiment of this application, when the communication interface is a transceiver, the transceiver may include an independent receiver and an independent transmitter, or may be a transceiver integrated with a transceiver function or an interface circuit.

The apparatus 1000 may further include a communication line 1040. The communication interface 1010, the processor 1020, and the memory 1030 may be connected to each other through the communication line 1040. The communication line 1040 may be a peripheral component interconnect (PCI) bus, an extended industry standard architecture (EISA) bus, or the like. The communication line 1040 may be classified into an address bus, a data bus, a control bus, and the like. For ease of representation, only one thick line is used to represent the bus in FIG. 10, but this does not mean that there is only one bus or only one type of bus.

The processor 1020 is configured to determine a traffic volume in a first time unit; determine, based on the traffic volume and a first mapping relationship, to enable a first quantity of radio frequency channels in the first time unit, where the first mapping relationship includes a mapping relationship between the traffic volume and a quantity of radio frequency channels.

The communication interface 1010 is configured to transmit a service through the first quantity of radio frequency channels in the first time unit, where the service includes at least one of a data channel and a reference signal.

In a possible design, before the service is transmitted through the first quantity of radio frequency channels, the processor 1020 is further configured to: determine a second mapping relationship between the first quantity of radio frequency channels and a second quantity of antenna ports, where the second quantity does not vary with the first quantity.

In a possible design, the second mapping relationship includes a mapping relationship between any one of the second quantity of antenna ports and at least one of the first quantity of radio frequency channels.

When the first quantity is greater than or equal to the second quantity, different antenna ports of the second quantity of antenna ports are mapped to different radio frequency channels.

Alternatively, when the first quantity is less than the second quantity, at least two of different antenna ports of the second quantity of antenna ports are mapped to a same radio frequency channel.

In a possible design, when the first quantity is less than the second quantity, when the first quantity is greater than 1, and the second quantity of antenna ports include at least two antenna ports for transmitting a diversity-based transmit data channel, each of the at least two antenna ports is mapped to a different radio frequency channel.

In a possible design, the communication interface 1010 is specifically configured to:

transmit, based on the second mapping relationship through at least one radio frequency channel to which each of the second quantity of antenna ports is mapped, a service corresponding to each antenna port.

In a possible design, the first quantity of radio frequency channels is a quantity of radio frequency channels included in a second radio frequency channel group or a quantity of radio frequency channels included in a first radio frequency channel group.

The processor 1020 is specifically configured to:
if the traffic volume is less than a first threshold, enable the first radio frequency channel group or the second radio frequency channel group in the first time unit; and
if the traffic volume is greater than or equal to the first threshold, enable the first radio frequency channel group in the first time unit, where
the radio frequency channels included in the second radio frequency channel group are radio frequency channels shared by the first radio frequency channel group and the second radio frequency channel group, and the quantity of radio frequency channels included in the first radio frequency channel group is greater than the quantity of radio frequency channels included in the second radio frequency channel group.

In a possible design, the communication interface 1010 is specifically configured to:
if the traffic volume is less than the first threshold, send the reference signal through a first antenna port group corresponding to the first radio frequency channel group in the first time unit; and send a data channel in the first time unit through a second antenna port group corresponding to the second radio frequency channel group.

In a possible design, the communication interface 1010 is specifically configured to: if the traffic volume is greater than or equal to the first threshold, send the reference signal and the data channel in the first time unit through the first antenna port group corresponding to the first radio frequency channel group.

In a possible design, any antenna port in the second antenna port group belongs to the first antenna port group, and the first antenna port group includes at least one antenna port that does not belong to the second antenna port group, where one antenna port group includes at least one antenna port.

In a possible design, the traffic volume includes a first traffic volume of a first cell and a second traffic volume of a second cell. The first cell and the second cell belong to a same network device.

In a possible design, the first quantity of radio frequency channels is a quantity of radio frequency channels included in a fourth radio frequency channel group or a quantity of radio frequency channels included in a third radio frequency channel group.

The processor 1020 is specifically configured to:
if at least one of the first traffic volume and the second traffic volume is greater than or equal to a second threshold, enable the third radio frequency channel group in the first time unit; and
if both the first traffic volume and the second traffic volume are less than the second threshold, enable the fourth radio frequency channel group in the first time unit, where
the radio frequency channels included in the fourth radio frequency channel group are radio frequency channels shared by the third radio frequency channel group and the fourth radio frequency channel group, and the quantity of radio frequency channels included in the third radio frequency channel group is greater than the quantity of radio frequency channels included in the fourth radio frequency channel group.

In a possible design, the communication interface 1010 is specifically configured to:
when the third radio frequency channel group is enabled in the first time unit, send a service of the first cell and/or a service of the second cell through the third radio frequency channel group; or
when the fourth radio frequency channel group is enabled in the first time unit, send a service of the first cell and/or a service of the second cell through the fourth radio frequency channel group.

In a possible design, the first quantity of radio frequency channels is a quantity of radio frequency channels included in a fifth radio frequency channel group, or a quantity of radio frequency channels included in a sixth radio frequency channel group, or a quantity of radio frequency channels included in a seventh radio frequency channel group.

The processor 1020 is specifically configured to:
if the traffic volume is greater than or equal to the second threshold, enable the fifth radio frequency channel group;
if the traffic volume is greater than the first threshold and less than the second threshold, enable the sixth radio frequency channel group; and
if the traffic volume is less than or equal to the first threshold, enable the seventh radio frequency channel group, where
all radio frequency channels included in the sixth radio frequency channel group belong to the fifth radio frequency channel group, and the quantity of radio frequency channels included in the fifth radio frequency channel group is greater than the quantity of radio frequency channels included in the sixth radio frequency channel group; and
all radio frequency channels included in the seventh radio frequency channel group belong to the fifth radio frequency channel group, and the quantity of radio frequency channels included in the sixth radio frequency channel group is greater than the quantity of radio frequency channels included in the seventh radio frequency channel group.

In a possible design, the communication interface 1010 is specifically configured to:
when the fifth radio frequency channel group is enabled in the first time unit, transmit the service through the fifth radio frequency channel group;
when the sixth radio frequency channel group is enabled in the first time unit, transmit the service through the sixth radio frequency channel group; or
when the seventh radio frequency channel group is enabled in the first time unit, transmit the service through the seventh radio frequency channel group.

In a possible design, when the service is a downlink service, the radio frequency channel includes at least one of a power amplifier, a low noise amplifier, a digital-to-analog converter, and a radio frequency signal processing unit.

Alternatively, when the service is an uplink service, the radio frequency channel includes at least one of a small-signal amplifier, a low noise amplifier, an analog-to-digital converter, and a radio frequency signal processing unit.

Persons skilled in the art should understand that embodiments of this application may be provided as a method, a system, or a computer program product. Therefore, this application may use a form of a hardware-only embodiment, a software-only embodiment, or an embodiment with a combination of software and hardware. Moreover, this application may use a form of a computer program product that is implemented on one or more computer-usable storage media (including but not limited to a disk memory, an optical memory, and the like) that include compute-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or the processor of the another programmable data processing device generate an apparatus for implementing a specific function in one or more processes in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

It is clear that persons skilled in the art can make various modifications and variations to this application without departing from the scope of this application. This application is intended to cover these modifications and variations of this application provided that they fall within the scope of the claims of this application and equivalent technologies thereof.

What is claimed is:

1. A method, comprising:
enabling, based on a traffic volume in a first time unit, a first quantity of radio frequency channels in the first time unit, wherein radio frequency channels of the first quantity of radio frequency channels are mapped to a second quantity of antenna ports, and wherein the second quantity of antenna ports does not vary with a quantity of enabled radio frequency channels; and
transmitting a service through the first quantity of radio frequency channels in the first time unit, wherein the service comprises at least one of a data channel or a reference signal.

2. The method according to claim 1, wherein:
when the first quantity of radio frequency channels is greater than or equal to the second quantity of antenna ports, different antenna ports of the second quantity of antenna ports are mapped to different radio frequency channels; or
when the first quantity of radio frequency channels is less than the second quantity of antenna ports, at least two different antenna ports of the second quantity of antenna ports are mapped to a same radio frequency channel.

3. The method according to claim 2, further comprising:
when the first quantity of radio frequency channels is less than the second quantity of antenna ports and greater than 1, and the second quantity of antenna ports comprises at least two antenna ports for transmitting a diversity-based transmit data channel, each of the at least two antenna ports is mapped to a different radio frequency channel.

4. The method according to claim 3, wherein transmitting the service through the first quantity of radio frequency channels comprises:
transmitting, through at least one radio frequency channel to which each of the second quantity of antenna ports is mapped, a service corresponding to each antenna port.

5. The method according to claim 1, wherein the first quantity of radio frequency channels is a quantity of radio frequency channels comprised in a second radio frequency channel group or a quantity of radio frequency channels comprised in a first radio frequency channel group; and
wherein enabling, based on the traffic volume in the first time unit, the first quantity of radio frequency channels in the first time unit comprises:
when the traffic volume in the first time unit is less than a first threshold, enabling the first radio frequency channel group or the second radio frequency channel group in the first time unit; or
when the traffic volume in the first time unit is greater than or equal to the first threshold, enabling the first radio frequency channel group in the first time unit; and
wherein the radio frequency channels comprised in the second radio frequency channel group are radio frequency channels shared by the first radio frequency channel group and the second radio frequency channel group, and the quantity of radio frequency channels comprised in the first radio frequency channel group is greater than the quantity of radio frequency channels comprised in the second radio frequency channel group.

6. The method according to claim 5, wherein transmitting the service through the first quantity of radio frequency channels comprises:
when the traffic volume in the first time unit is less than the first threshold:
sending the reference signal in the first time unit through a first antenna port group corresponding to the first radio frequency channel group; and
sending the data channel in the first time unit through a second antenna port group corresponding to the second radio frequency channel group.

7. The method according to claim 6, wherein the traffic volume in the first time unit is greater than or equal to the first threshold, and the reference signal and the data channel are sent in the first time unit through the first antenna port group corresponding to the first radio frequency channel group.

8. The method according to claim 6, wherein each antenna port in the second antenna port group belongs to the first antenna port group, and the first antenna port group comprises at least one antenna port that does not belong to the second antenna port group, and wherein each one antenna port group comprises at least one antenna port.

9. The method according to claim 1, wherein the traffic volume in the first time unit comprises a first traffic volume of a first cell and a second traffic volume of a second cell, and the first cell and the second cell belong to a same network device.

10. The method according to claim 9, wherein the first quantity of radio frequency channels is a quantity of radio frequency channels comprised in a fourth radio frequency channel group or a quantity of radio frequency channels comprised in a third radio frequency channel group;
wherein enabling, based on the traffic volume in the first time unit, the first quantity of radio frequency channels in the first time unit comprises:
when at least one of the first traffic volume of the first cell and the second traffic volume of the second cell is greater than or equal to a second threshold, enabling the third radio frequency channel group in the first time unit; or
when both the first traffic volume of the first cell and the second traffic volume of the second cell are less than the second threshold, enabling the fourth radio frequency channel group in the first time unit; and
wherein the radio frequency channels comprised in the fourth radio frequency channel group are radio frequency channels shared by the third radio frequency channel group and the fourth radio frequency channel group, and the quantity of radio frequency channels comprised in the third radio frequency channel group is greater than the quantity of radio frequency channels comprised in the fourth radio frequency channel group.

11. The method according to claim 10, wherein transmitting the service through the first quantity of radio frequency channels comprises:
when the third radio frequency channel group is enabled in the first time unit, sending a service of the first cell or a service of the second cell through the third radio frequency channel group; or when the fourth radio frequency channel group is enabled in the first time unit, sending a service of the first cell or a service of the second cell through the fourth radio frequency channel group.

12. The method according to claim 10, wherein the first quantity of radio frequency channels is a quantity of radio frequency channels comprised in a fifth radio frequency channel group, or a quantity of radio frequency channels comprised in a sixth radio frequency channel group, or a quantity of radio frequency channels comprised in a seventh radio frequency channel group;
wherein enabling, based on the traffic volume in the first time unit, the first quantity of radio frequency channels in the first time unit comprises:
when the traffic volume is greater than or equal to a second threshold, enabling the fifth radio frequency channel group;
when the traffic volume is greater than a first threshold and less than the second threshold, enabling the sixth radio frequency channel group; or
when the traffic volume is less than or equal to the first threshold, enabling the seventh radio frequency channel group;
wherein all radio frequency channels comprised in the sixth radio frequency channel group belong to the fifth radio frequency channel group, and the quantity of radio frequency channels comprised in the fifth radio frequency channel group is greater than the quantity of radio frequency channels comprised in the sixth radio frequency channel group; and
wherein all radio frequency channels comprised in the seventh radio frequency channel group belong to the fifth radio frequency channel group, and the quantity of radio frequency channels comprised in the sixth radio frequency channel group is greater than the quantity of radio frequency channels comprised in the seventh radio frequency channel group.

13. The method according to claim 12, wherein transmitting the service through the first quantity of radio frequency channels comprises:
when the fifth radio frequency channel group is enabled in the first time unit, transmitting the service through the fifth radio frequency channel group;
when the sixth radio frequency channel group is enabled in the first time unit, transmitting the service through the sixth radio frequency channel group; or
when the seventh radio frequency channel group is enabled in the first time unit, transmitting the service through the seventh radio frequency channel group.

14. The method according to claim 1, wherein:
when the service is a downlink service, each radio frequency channel comprises at least one of a power amplifier, a low noise amplifier, a digital-to-analog converter, or a radio frequency signal processor; or
when the service is an uplink service, each radio frequency channel comprises at least one of a small-signal amplifier, a low noise amplifier, an analog-to-digital converter, or a radio frequency signal processor.

15. The method according to claim 1, wherein the first quantity is 1, 2, 4, or 8, and the second quantity is 4.

16. An apparatus, comprising:
at least one processor; and
a memory coupled to the at least one processor, wherein the memory comprises instructions that, when executed by the at least one processor, the apparatus perform operations comprising:
enabling, based on a traffic volume in a first time unit, a first quantity of radio frequency channels in the first time unit, wherein radio frequency channels of the first quantity of radio frequency channels are mapped to a second quantity of antenna ports, and wherein the second quantity of antenna ports does not vary with a quantity of enabled radio frequency channels; and
transmitting a service through the first quantity of radio frequency channels in the first time unit, wherein the service comprises at least one of a data channel or a reference signal.

17. The apparatus according to claim 16, wherein:
when the first quantity of radio frequency channels is greater than or equal to the second quantity of antenna ports, different antenna ports of the second quantity of antenna ports are mapped to different radio frequency channels; or
when the first quantity of radio frequency channels is less than the second quantity of antenna ports, at least two of different antenna ports of the second quantity of antenna ports are mapped to a same radio frequency channel.

18. The apparatus according to claim 17, wherein the operations further comprise:
when the first quantity of radio frequency channels is less than the second quantity of antenna ports and greater than 1, and the second quantity of antenna ports comprise at least two antenna ports for transmitting a diversity-based transmit data channel, each of the at least two antenna ports is mapped to a different radio frequency channel.

19. The apparatus according to claim 17, wherein the operations further comprise:
transmitting, through at least one radio frequency channel to which each of the second quantity of antenna ports is mapped, a service corresponding to each antenna port.

20. The apparatus according to claim 16, wherein the first quantity is 1, 2, 4, or 8, and the second quantity is 4.

* * * * *